United States Patent [19]
Liebowitz et al.

[11] Patent Number: 5,812,545
[45] Date of Patent: Sep. 22, 1998

[54] FULL MESH SATELLITE-BASED MULTIMEDIA NETWORKING SYSTEM

[75] Inventors: Burt Liebowitz, North Bethesda; Steven Sweeney, Silver Spring, both of Md.; Heinrich Arens, Oberteuringen; Franz Thaller, Bermatingen, both of Germany

[73] Assignees: Orion Atlantic, L.P., Rockville, Md.; Nortel Dasa Network Systems GmbH & Co., Germany

[21] Appl. No.: 589,255

[22] Filed: Jan. 23, 1996

Related U.S. Application Data

[63] Continuation-in-part of Ser. No. 582,753, Jan. 4, 1996, abandoned.
[51] Int. Cl.⁶ .................................................. H04J 3/16
[52] U.S. Cl. ..................... 370/337; 370/348; 370/444; 370/468
[58] Field of Search .................................. 370/315, 314, 370/316, 319, 321, 322, 324, 326, 328, 329, 336–338, 345, 347, 348, 350, 431, 442, 443, 444, 501, 514, 464, 468, 498, 476, 474; 340/825.5, 825.51; 455/12.1, 13.1, 13.2, 53.1

[56] References Cited

U.S. PATENT DOCUMENTS

| | | | |
|---|---|---|---|
| 4,256,925 | 3/1981 | Goode | 370/322 |
| 4,273,962 | 6/1981 | Wolfe | 379/115 |
| 4,319,353 | 3/1982 | Alvarez, III et al. | 370/321 |
| 4,322,845 | 3/1982 | Fennel, Jr. et al. | 370/321 |
| 4,330,857 | 5/1982 | Alvarez, III et al. | 370/321 |
| 4,424,417 | 1/1984 | Chavey et al. | 370/319 |
| 4,507,781 | 3/1985 | Alvarez, III et al. | 370/266 |
| 4,642,806 | 2/1987 | Hewitt et al. | 370/347 |
| 4,774,707 | 9/1988 | Raychaudhuri | 370/447 |
| 4,870,642 | 9/1989 | Nohara et al. | 370/319 |
| 4,888,769 | 12/1989 | Deal | 370/321 |
| 4,995,096 | 2/1991 | Isoe | 455/121 |
| 5,012,469 | 4/1991 | Sardana | 370/322 |
| 5,072,445 | 12/1991 | Nawata | 370/324 |
| 5,239,545 | 8/1993 | Buchholz | 370/348 |
| 5,307,348 | 4/1994 | Buchholz et al. | 370/348 |
| 5,309,439 | 5/1994 | Roos | 370/508 |
| 5,392,450 | 2/1995 | Nossen | 455/12.1 |

FOREIGN PATENT DOCUMENTS

| | | | |
|---|---|---|---|
| 0324363 | 1/1989 | European Pat. Off. | H04B 7/185 |
| WO 0001012 | 1/1995 | WIPO | H04B 7/212 |

OTHER PUBLICATIONS

Muller, Nathan J., "The Management Aspects of Frame Relay", International Journal of Network Management, Jun. 1992, pp. 87–99.

(List continued on next page.)

*Primary Examiner*—Benedict V. Safourek
*Assistant Examiner*—Seema S. Rao
*Attorney, Agent, or Firm*—Roylance, Abrams, Berdo & Goodman, L.L.P.

[57] ABSTRACT

A satellite communications system is provided for full mesh connectivity between a number of earth terminals via a satellite link. The earth terminals are connected to user access devices to receive and transmit voice, video and data and are operable to generate bursts to transmit user data via a satellite, and to process data received from the satellite and transmit it to the addressed user access devices. The terminals each comprise a programmable computing device which prioritizes data into bursts using a fragmentation protocol. The programmable computing device also organizes bursts in at least one of a plurality of slots constituting a time division multiple access frame in accordance with a burst plan. Each terminal has access to a guaranteed number of the slots. The allocation of the remaining slots among the terminals varies dynamically to increase or decrease the burst transmission rates of the terminals as needed. Dynamic assignment of slots depends on committed information rates, the lengths of data queues in the terminals and the type of data to be transmitted. Terminals need not be assigned consecutive ones of the dynamically assignable slots.

34 Claims, 10 Drawing Sheets

OTHER PUBLICATIONS

Roy, Asim, "Frame Relay and Its Transportation Dilemma", Proceedings from the 1991 Singapore International Conference on Networks (Singapore, May–Jun. 9, 1991) pp. 398–400.

Rana, Abdul Hamid, "VSAT–Enhanced ISDN: Architectures and Implementation", IEEE Journal on Selected Areas in Communications, Aug. 19, 1992, No. 6, pp. 1081–1092.

Platt, A. et al, "Some Aspects of Traffic Management in Frame Relay Networks", CA Conference Article, IEE Eight UK, Teletraffic Symposium, 1991 Beeston, U.K., pp. 23/1–23/6.

Pontano, B.A. et al, "ISDN Over Satellite Networks", Proceedings of the Miloom 1992 Conference on Communications–Fusing Command, Control and Intelligence, San Diego, Oct. 11–14, 1992, vol. 2 of the Conference Record, pp. 561–564.

Liebowitz, Burt, "Cost Effectiveness of TDMA Based, Full Meshed VSAT Networks", presented at International Telecommunications Society Conference, Sep. 1, 1995, Nice, France.

Liebowitz, Burt, "Multi Media Meshed Networking Using VISN", presented at York Electronics Center, University of York, England, for course entitled VSAT Systems Technology Applications and Opportunities. Apr. 1995.

Wilmot, Chris, *Frame Relay Solution,* Feb./Mar. 1996, vol. 1, No. 2., pp. 11–16 (CMI Ltd., London).

Fleming, Stephen, "What Users Can Expect From New Virtual Wideband Devices", *Telecommunications,* Oct., 1990, vol. 24, No. 10, pp. 29–36.

Gordon, James, "Extending the LAN Range", *Telecommunications,* Oct., 1990, vol. 24, No. 10, pp. 66–68.

FIG. 10

NUI: XYZ549
SOURCE: TERMINAL: WDC1(WASHINGTON,D.C.) DESTINATION: TERMINAL: LON1(LONDON)
PORT: 1 PORT: 2
DLCI: 32 DLCI: 24
CIR: 64Kbps CIR PRICE $320.00

| DATE | PRIME HOUR KILO-CHARACTERS SENT | NON-PRIME HOUR KILO-CHARACTERS SENT | PRIME HOUR PRICE | NON-PRIME HOUR PRICE | PRICE |
|---|---|---|---|---|---|
| 11-NOV | 320 | 890 | $28.00 | $45.00 | $63.00 |
| 12-NOV | 350 | 1020 | $28.90 | $53.20 | $82.10 |

NUI: LAN901
TERMINAL: WDC1(WASHINGTON,D.C.)
PORT: 4

| DATE | PRIME HOUR KILO-CHARACTERS SENT | NON-PRIME HOUR KILO-CHARACTERS SENT | PRIME HOUR PRICE | NON-PRIME HOUR PRICE | PRICE |
|---|---|---|---|---|---|
| 11-NOV | 1020 | 2200 | $34.00 | $40.20 | $74.20 |

NUI: VC101
TERMINAL: WDC1(WASHINGTON,D.C.)
VISN PORT: 1
MUX PORT: 8

| DATE | TIME | CALL MADE TO: | | | | DURATION (in minutes) | RATE | PRICE |
| | | NUI | TERMINAL ID | VISN PORT | MUX PORT | | | |
|---|---|---|---|---|---|---|---|---|
| 11-NOV | 9:30 | VC987 | WAR1 | 1 | 1 | 23 | Y | $8.20 |

⎫ 216

FULL MESH SATELLITE-BASED MULTIMEDIA NETWORKING SYSTEM

This application is a continuation-in-part of U.S. patent application Ser. No. 08/582,753, filed Jan. 4, 1996, now abandoned the entire subject matter of which is hereby incorporated herein by references for all purposes.

FIELD OF THE INVENTION

The invention relates generally to satellite communication systems, and is particularly directed to earth station terminals configured to provide full mesh, multimedia, bi-directional communication with other terminals in a network. Further, the invention relates to satellite communication systems having dynamic bandwidth allocation, broadcast and multicast capability, and voice, data and video integration using a plurality of protocols.

BACKGROUND OF THE INVENTION

Recent technological advances have made satellite technology a viable option for inter-office communications. Satellite communication systems provide several advantages over terrestrial communications systems for networking applications. Terrestrial based communication systems are typically subject to the "last mile" problem, wherein circuits providing increased bandwidth for terrestrial communication are not compatible with existing, and typically analog, circuits available at most commercial facilities. Satellite communication avoids this problem by allowing transmission directly to and from the roof tops, for example, of commercial facilities within a network. Satellite communication systems are characterized by distance insensitivity within the coverage area of the satellite and are not subject to interference as are terrestrial communication systems. Satellite communication systems also have an inherent broadcast capability which simplifies routing in a full mesh network and facilitates multi-party videoconferencing. These benefits make satellite communications a preferred choice for multi-national, multi-media networks, especially where some or all of the sites are located remotely from a reliable communications infrastructure.

Until recently, however, most low cost satellite solutions, which supported full mesh connectivity between ground stations, required ground stations to be configured in a star topology. A master or hub station in a star network is typically too expensive for implementation in smaller networks. The star topology is also disadvantageous because it requires two satellite hops to obtain full connectivity. The resultant delays and reduced voice quality can be unacceptable in some applications. A double hop also makes less efficient use of the space segment.

The advent of low cost time division multiple access (TDMA) earth stations, which can operate in a network without a hub station, allows diverse sites to communicate with each other using only one satellite hop. Thus, the benefits of satellite communication can be extended to smaller networks and sites that do not have access to terrestrial communication services. Existing non-TDMA satellite communication systems, such as that disclosed in U.S. Pat. No. 5,434,850 to Fielding et al, do not allow terminals to share the space segment. Further, existing TDMA satellite communication systems such as that disclosed in U.S. Pat. No. 4,319,353 to Alvarez, III. et al do not allow statistical multiplexing among terminals based on the quantity, as well as the type, of messages that need to be transmitted via the space segment.

SUMMARY OF THE INVENTION

In accordance with an embodiment of the present invention, a satellite communication system is provided which uses TDMA/DAMA (time division multiple access/demand assigned multiple access) switching technology to efficiently transmit voice, video and bursty data. TDMA/DAMA switching provides significant cost benefits due to shared use of the space segment. Demanding real time transmissions, such as voice and video data, share bandwidth with bursty data streams from local area networks. Users can order low bit rate services for most of the day, and acquire and pay for higher rate channels only when they are needed. Video channels can be acquired on-demand, and paid for only as long as they are used. Voice calls are connected as needed. Since voice is digitized and packetized, silence periods can be used for the transmission of lower priority data file transfers. The system of the present invention provides services for data, and dial-up services for voice and video. Multi-user video conferencing can also be provided.

The system of the present invention can provide hub-less, full mesh connectivity, both fixed and dynamic bandwidth allocation, voice, video and data integration, support for frame relay and voice, support for protocols such as SNA, TCP/IP, and binary synchronous (BSC), and broadcast and multicast transmission capability, while being relatively less expensive than other fully meshed satellite communication systems.

A satellite communications system in accordance with an embodiment of the present invention provides full mesh connectivity between a number of earth terminals via a satellite link. The earth terminals are connected to user access devices to receive and transmit voice, video and data. The earth terminals are operable to generate bursts to transmit user data via a satellite, to process data received from the satellite, and to transmit received data to the addressed user access devices.

The terminals each comprise a programmable computing device (PCD), which can be either a special purpose computer, or a general purpose computer programmed to support a variety of functions, to implement computing requirements for providing full mesh networking communications. The PCD processes input data in the form of frames. These frames can conform to any of several formats such as Ethernet and frame relay.

The PCD can operate as a switch which prioritizes data into bursts using a fragmentation protocol. The switch organizes bursts in at least one of a plurality of slots constituting a time division multiple access (TDMA) frame in accordance with a burst plan. In accordance with an embodiment of the present embodiment, the slots are of fixed duration. However, systems can be built wherein the slots are of variable duration. Each terminal has access to a guaranteed number of the slots. The allocation of the remaining slots among the terminals varies dynamically to increase or decrease the burst transmission rates of the terminals as needed. Dynamic assignment of slots depends on the committed information rates (CIR) of the terminals and the lengths of data queues in the terminals. Terminals need not be assigned consecutive ones of the dynamically assignable slots.

DETAILED DESCRIPTION OF THE DRAWINGS

These and other features and advantages of the present invention will be more readily apprehended from the following detailed description when read in connection with the appended drawings, which form a part of this original disclosure, and wherein:

FIGS. 10, 11 and 12 illustrate exemplary portions of an invoice generated by the billing system depicted in FIG. 9 in accordance with an embodiment of the present invention.

DETAILED DESCRIPTION OF PREFERRED EMBODIMENTS

Figure 1:
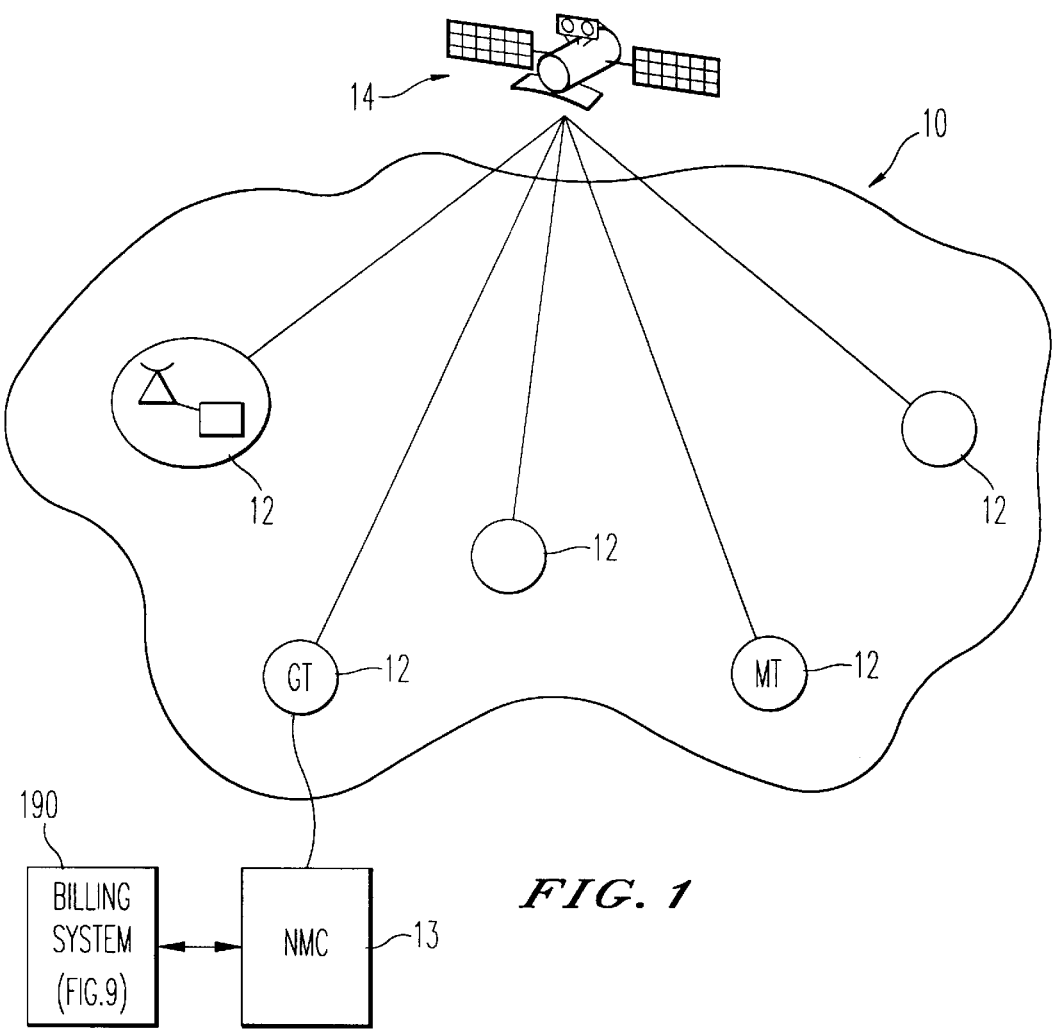
FIG. 1 illustrates a full mesh, satellite-based, multimedia network constructed in accordance with an embodiment of the present invention.

FIG. 1 depicts a communications system 10 comprising a number of earth stations or terminals 12 configured to provide packet-based communication via a satellite 14. The terminals 12 provide full mesh connectivity among multiple user sites, that is, each terminal 12 can communicate with all other terminals 12 using only a single satellite hop. The terminals 12 are programmed to perform specialized functions, including operating as a manager terminal (MT) and as a gateway terminal (GT). The MT controls the allocation of bandwidth in the system 10. The GT provides an interface between all terminals and a Network Management Center (NMC) 13. As will be described below, each of the terminals 12 is programmed to be designated as the MT, but preferably only one terminal 12 operates as the MT at one time, in accordance with an embodiment of the present invention. The satellite 14 is preferably a geosynchronous earth orbit satellite which operates in conjunction with on-board, networked transponders to provide a one hop, full mesh network on, for example, more than one continent.

Figure 2:
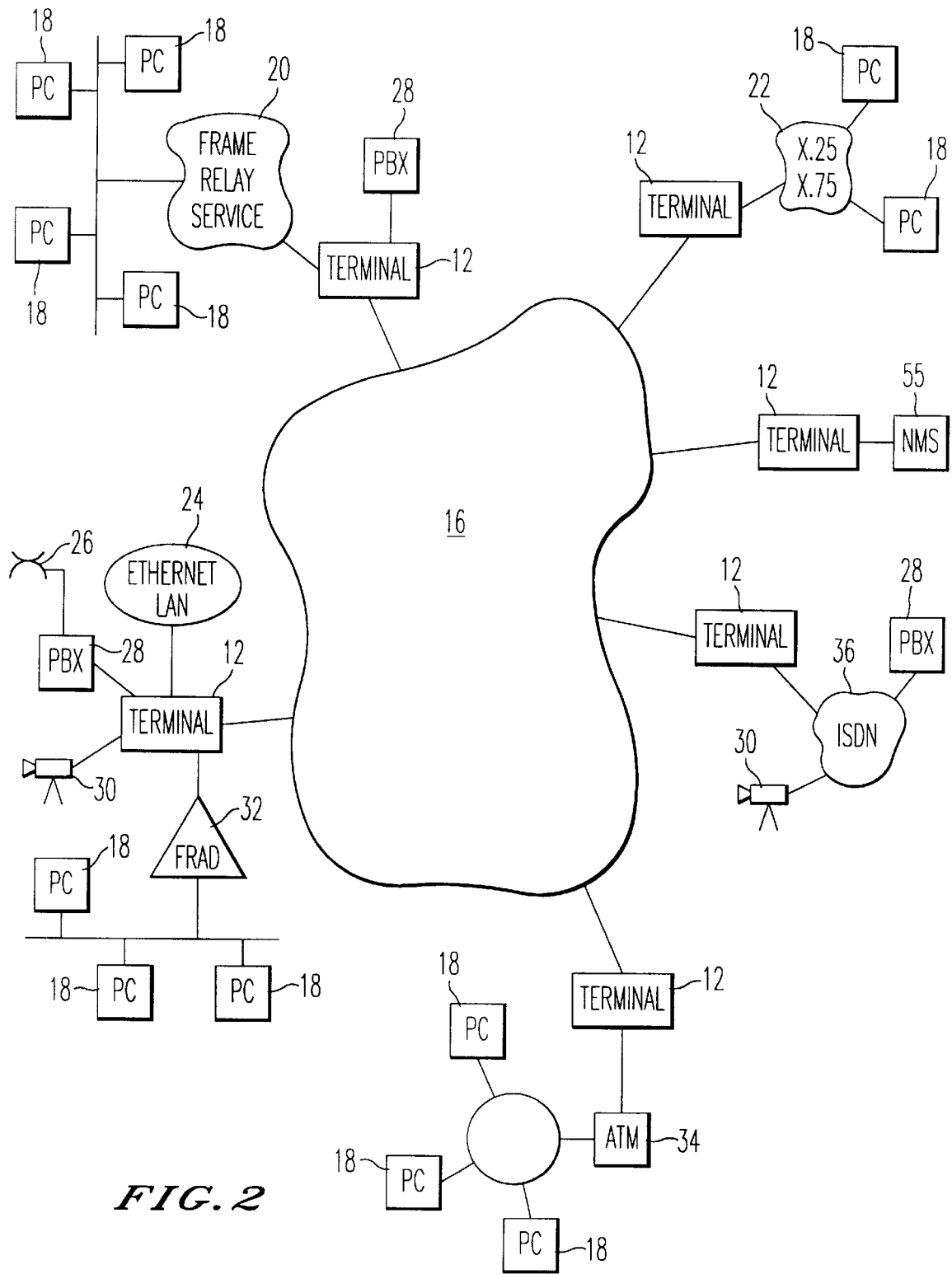
FIG. 2 depicts a number of different user access devices which can communicate with each other via a satellite link in accordance with an embodiment of the present invention.

With reference to FIG. 2, each terminal 12 is adapted to interface with voice, video and data access devices to transmit and receive voice, video and data across the satellite link, indicated at 16. A terminal 12 can be connected to a number of computers or workstations 18 via a number of communications services, operating in accordance with a protocol such as SNA/SDLC, HDLC, CCITT X.25, CCITT X.75, or Ethernet. Telephones 26 can be connected to a terminal 12 via a private branch exchange (PBX) 28 or other subscriber link. Video equipment 30 and frame relay access devices (FRADs) 32 can also be connected to a terminal 12, as well as digital access devices via an asynchronous transfer mode (ATM) network 34 and an integrated services digital network (ISDN) 36.

Figure 3:
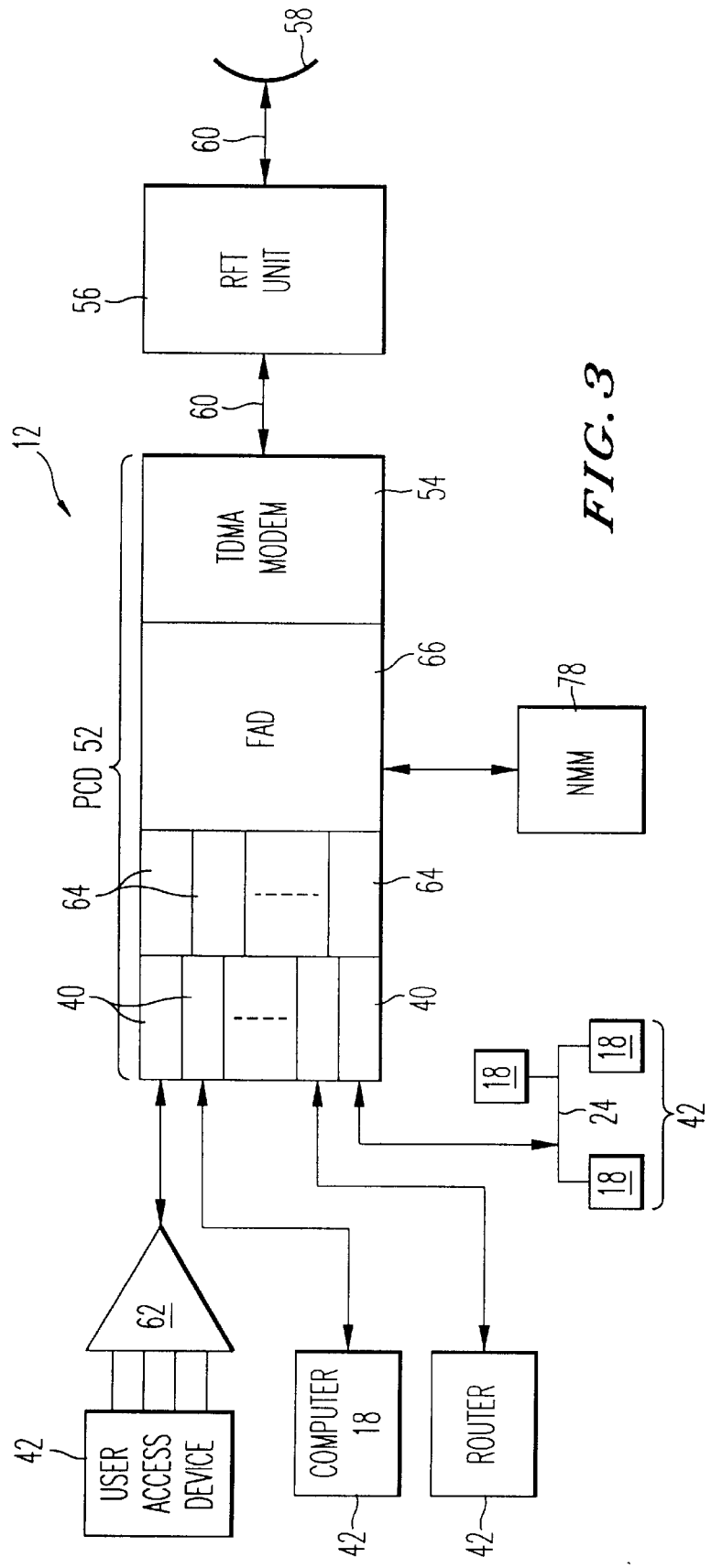
FIG. 3 depicts an examplary hardware configuration in accordance with an embodiment of the present invention.

An exemplary terminal 12 constructed in accordance with an embodiment of the present invention is depicted in FIG. 3. The terminal 12 comprises a number of ports (indicated generally at 40) for interfacing with a number of user access devices 42 such as telephones, videoconference equipment, stand-alone computers and computer networks (e.g., a LAN). In addition to the ports 40, each terminal 12 comprises a PCD 52, a TDMA modem 54, a radio frequency transceiver (RFT) unit 56, an antenna 58, and appropriate interconnecting cables indicated generally at 60.

Figure 4:
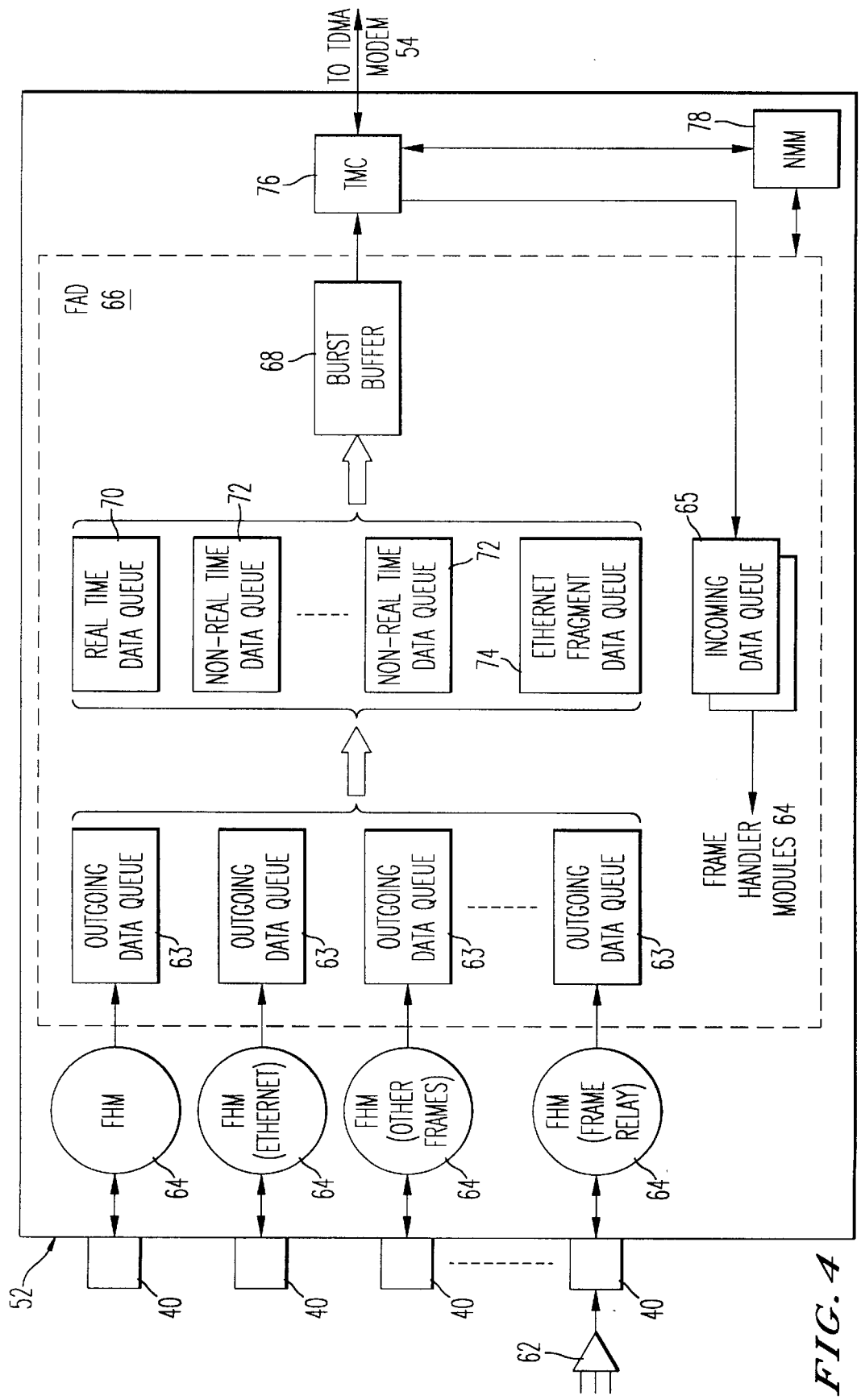
FIG. 4 depicts the logical flow of information and the major processing functions of the PCD constructed in accordance with an embodiment of the present invention and operable to communicate with other terminals via a satellite link.

FIG. 4 describes processing data flow and functions performed within the PCD 52. Data received at the terminal 12 from locally attached devices such as LANs, frame relay switches, voice multiplexers and the like generally arrive either as frames or bit streams. If the data is in bit streams, each bit stream is converted into frames within the terminal 12. The frames can be generated from data, voice or video sources 42. If the sources 42 are video or voice, a device is generally provided to the terminal 12 to convert the input video or voice into frames. For example, a voice multiplexer 62 can convert analog voice into compressed data, and then encapsulate the data in a frame relay frame. The voice multiplexer 62 has processing capability to associate a unique identification number with each frame that can be used for routing purposes within the system 10.

A data frame, from one of a number of different sources, is transmitted from the local user access device 42 to a port 40 connected to the PCD 52. The port 40 is programmed to support the frame format used in the user access device, that is, a Frame Handler module 64 in the PCD 52 processes the frame, accordingly. The information identifying the destination of the frame is provided in the frame in accordance with the frame format. There can be multiple Frame Handler modules 64 to support different formats and a multiplicity of communication ports 40, as shown in FIG. 4. The Frame Handler module 64 performs error checking. Invalid frames are discarded, and a record is preferably kept of all errors for network management purposes. Valid frames are transmitted to the Fragment Assembler/Disassembler (FAD) 66. The FAD 66 preferably creates an outgoing data queue 63 corresponding to each user access device 42 for storing data received therefrom via a corresponding Frame Handler module. The FAD 66 also creates preferably multiple incoming data queues indicated generally at 65 for storing data received via the satellite 14 and addressed to user access devices 42 connected to that terminal 12.

Figure 7:
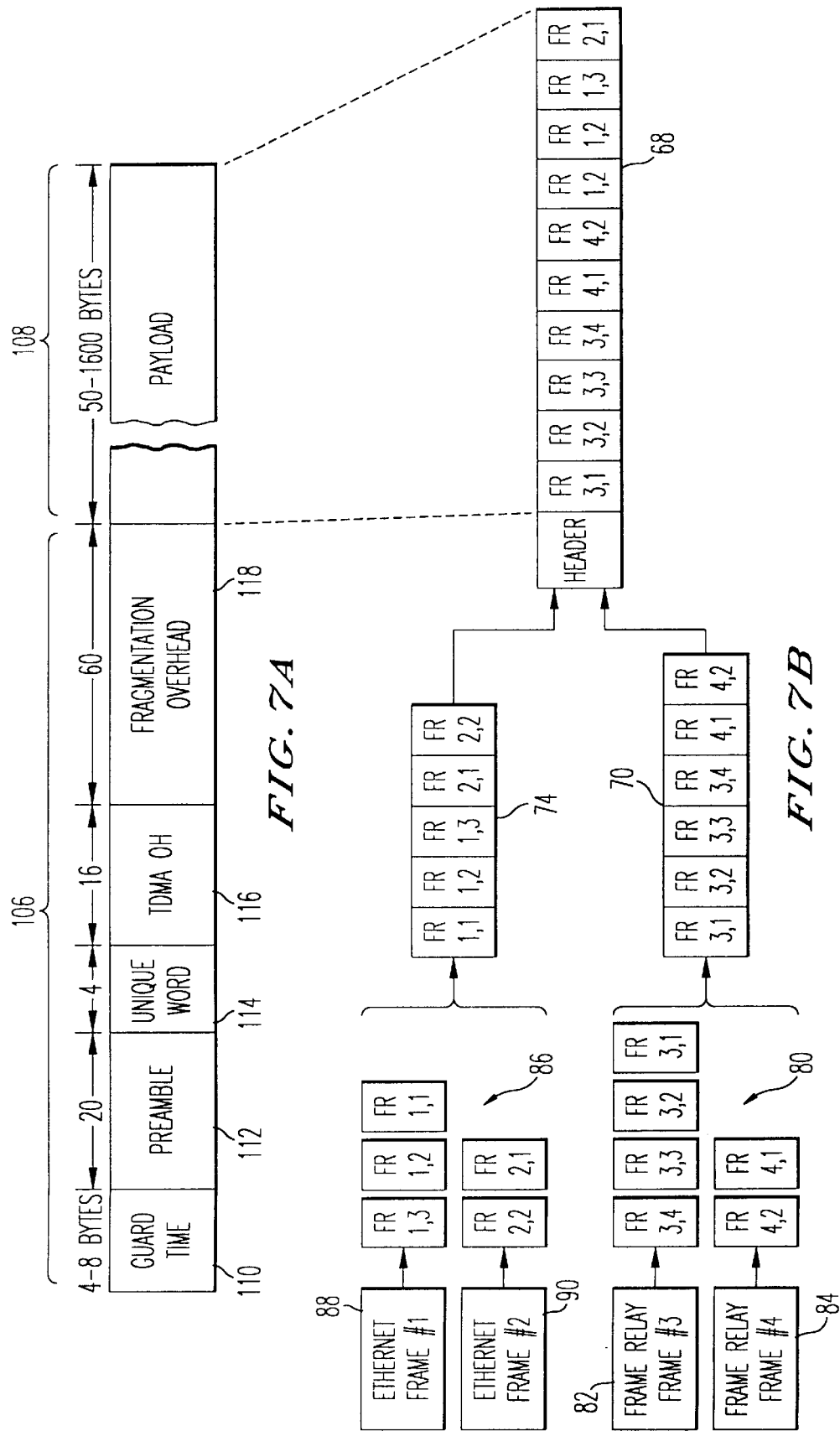
FIG. 7 illustrates a burst which is configured in accordance with an embodiment of the present invention for transmission in a TDMA frame by an terminal.

The FAD 66 can break each frame into smaller data segments called fragments. The FAD 66 stores as many fragments as possible in a burst buffer 68. The FAD 66 can create several burst buffers 68, depending on the amount of data received from the user access devices 42 via the Frame Handler modules 64. The collection of fragments is called the payload 108 (FIG. 7). The burst buffer 68 also stores a payload header 106 (FIG. 7) which identifies the location of each fragment in a payload. The payload header 106 also provides a corresponding fragment identifier for each fragment in a payload, as described below in connection with FIG. 7. The fragment identifier relates a fragment to the frame from which it was derived. The burst buffer 68 also stores bandwidth requests for transmission in, for example, the header 106. The size of the burst buffer 68 is set by a network-wide parameter (i.e., the parameter "packet.length" listed in Table I).

If there are insufficient fragments to fill a burst buffer 68, the buffer 68 is padded with null characters. If there are more fragments available than can be stored in a burst buffer 68, a priority scheme is used to determine which fragments are be stored in the buffer 68. In accordance with an embodiment of the present invention, the priority scheme preferably provides at least two primary levels of priority, and a number of sublevels of priority. The first primary priority level is for real time data. The second primary priority level is for non-real time data. The classification of real and non-real time is arbitrary, and can be assigned using the NMC 13. Real time data is usually time-dependent data such as voice and video. Priority can be assigned by the port, or by the address of a virtual circuit. Non-real time data priority levels can be further determined by assigning CIRs to the port or virtual circuit.

In accordance with one embodiment of the invention, the FAD 66 stores real time data from the outgoing data queues 63 associated with ports configured to receive real time data in a single first in, first out (FIFO) data queue 70. Non-real time data from outgoing data queues 63 associated with ports configured to receive non-real time data are stored in multiple FIFO queues indicated generally at 72. One data queue 72 is preferably provided for each virtual circuit. Ethernet fragments from the outgoing data queues 63 corresponding to ports connected to sources 42 of Ethernet frames are stored in a single queue 74, as if all fragments belonged to the same virtual circuit. The Ethernet fragment data queue 74 is preferably assigned its own CIR. The FAD 66 is programmed to first examine the real time data queue 70. The FAD 66 selects all real time fragments available until either the burst buffer 68 is full, or the real time data queue 70 has been depleted. In the latter case, the FAD 66 fills the remaining buffer space in the payload 108 of the burst buffer 68 with non-real time fragments and Ethernet fragments in proportion to the CIRs of the respective virtual circuits and the Ethernet fragment data queue 74. For example, the virtual circuit having the highest CIR has the most fragments transferred from its non-real time data queue 72 to the burst buffer 68. This process is illustrated in FIG. 7 wherein all fragments (indicated generally at 80) derived from two frame relay frames 82 and 84 resulting from, for example, two voice calls are all transferred from the real time queue 70 to the burst buffer 68. The fragments 86 derived from exemplary Ethernet frames 88 and 90; however, are not all transferred into the burst buffer 68 because of insufficient space following the real time data from the queue 70.

The FAD 66 has access to a burst plan created by the terminal 12 currently operating as the MT. The burst plan determines when the FAD 66 can send bursts to a TDMA modem controller (TMC) 76. The FAD 66 also sends a timing indicator to the TMC 76 indicating the precise time that it can transmit a burst to the TDMA modem 54. Substantially precise burst timing ensures that only one terminal transmits during a burst duration or slot in a TDMA frame.

The FAD 66 monitors the size of the outgoing data queues 63 and looks for stream requests or releases in every frame received from user access devices 42. A stream request is a request for a guaranteed amount of bandwidth. Stream requests are usually made on behalf of voice or video calls. The FAD is programmed to recognize stream requests from a variety of sources and products. The FAD is also programmed to recognize the termination of such requests, so that it can notify the MT that the bandwidth is no longer needed. The FAD generates bandwidth requests using stream requests, releases and queue sizes for transmission to the terminal 12 designated to be the MT. The bandwidth requests do not request a specific amount of bandwidth, but rather reports the stream requests, releases and queue sizes to the MT. The terminal 12 operating as the MT, in turn, determines how to allocate bandwidth among all of the terminals 12 based on their collective bandwidth requests. The FAD also creates records of the length and type of each stream request, and the calling and called parties, for use by the NMC 13 and an associated billing system described below in connection with FIGS. 9–12.

Figure 6:
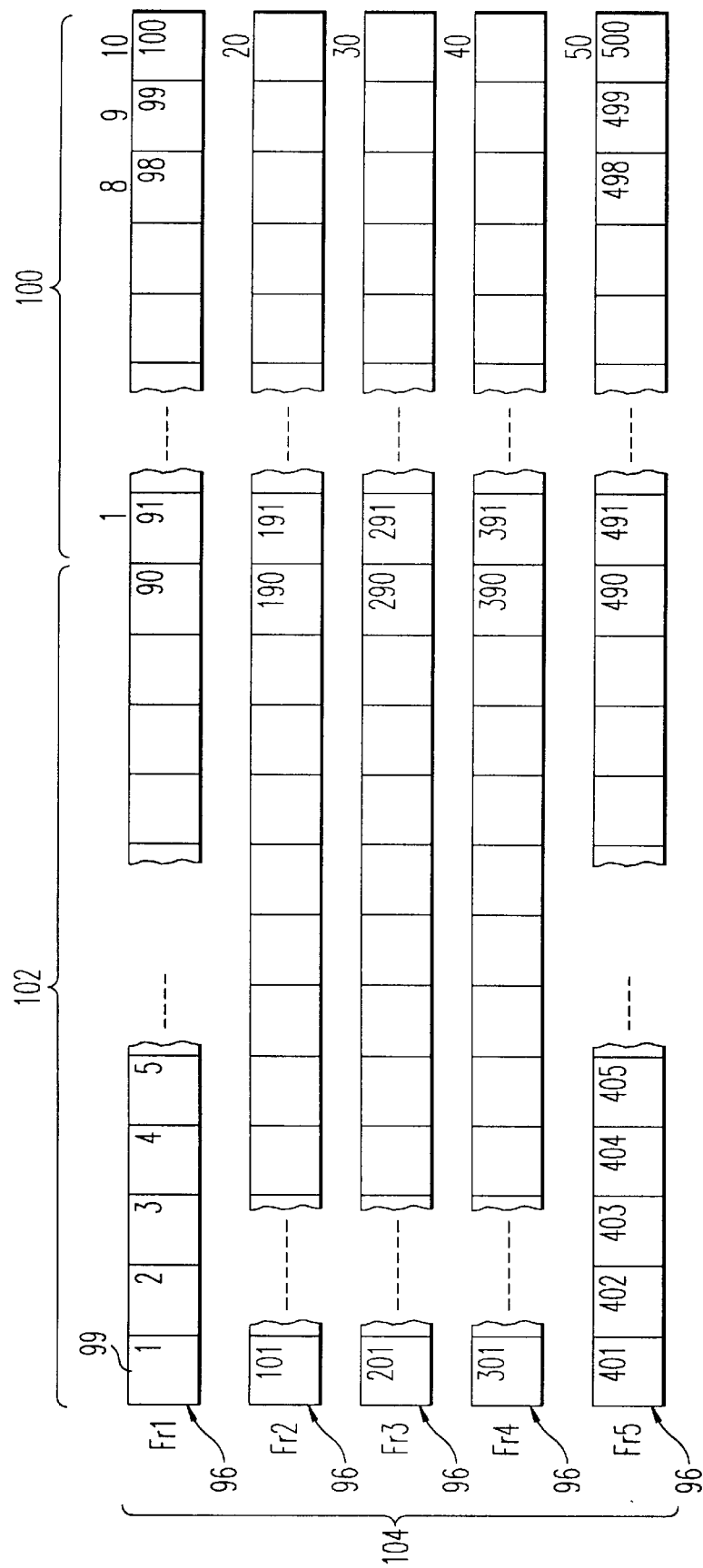
FIG. 6 illustrates a number of frames which constitute a TDMA superframe for use in the system depicted in FIG. 1 in accordance with an embodiment of the present invention.

As stated previously, each terminal 12 can request more bandwidth when needed from the terminal 12 operating as the MT, as well as to inform the MT via a stream release message when all or part of the additional bandwidth is no longer needed. The FAD 66 examines each frame in accordance with the high level application protocol corresponding to the source 42 of that frame to determine if a stream request or release is present. For example, if establishment of a voice call is desired on a port at a terminal 12, the FAD 66 of the terminal 12 determines whether or not an encoded message requesting connection from the voice multiplexer 62 is present in the frame received at the port. Once the FAD 66 identifies the encoded message, the FAD performs a table look-up operation to obtain an address of the called party corresponding to dial digits of the call. The address is inserted into the frame. The FAD 66 then requests additional bandwidth from the terminal 12 operating as the MT in preferably the header 106 (FIG. 7) of the next burst 98 sent from the terminal 12 to the satellite 14 during an assigned TDMA frame slot 96 (FIG. 6). The FAD 66 formats queue size information, as well as stream request information, into bandwidth requests. The FAD subsequently monitors frames received at the port for a hang-up message from the voice multiplexer 62 and, accordingly, transmits a stream release message to the MT via the satellite 14 once the hang-up message is received. Similarly, the FAD 66 can monitor frames at ports configured to receive video and Ethernet frames, for example, and determine whether or not a stream request or release message is contained therein in accordance with the high level application protocol or signal format used by the corresponding user access devices 42. The MT receives all bandwidth requests and releases transmitted by the terminals 12 and determines the most efficient burst plan, as described below.

The TMC 76 sends bursts to the TDMA modem 54 at specified times for transmission during assigned TDMA frame slots. The TDMA modem 54 encodes each burst to improve the reliability of transmission, and modulates an intermediate carrier for transmission of bursts to the RFT unit 56. The RFT unit 56 amplifies the modulated signal and converts the frequencies that comprise the signal into an appropriate band for transmission to the antenna 58, and from there the signal is radiated in the direction of the satellite 14.

In summary, data frames directed towards a terminal 12 by local user access devices 43 are fragmented for transmission efficiency, multiplexed according to a priority scheme, and stored in burst buffers 68 for burst transmission at a prescribed time. TDMA bursts are transmitted to a satellite 14, where they are broadcast on a downlink to all other terminals 12 tuned to the carrier.

Figure 5:
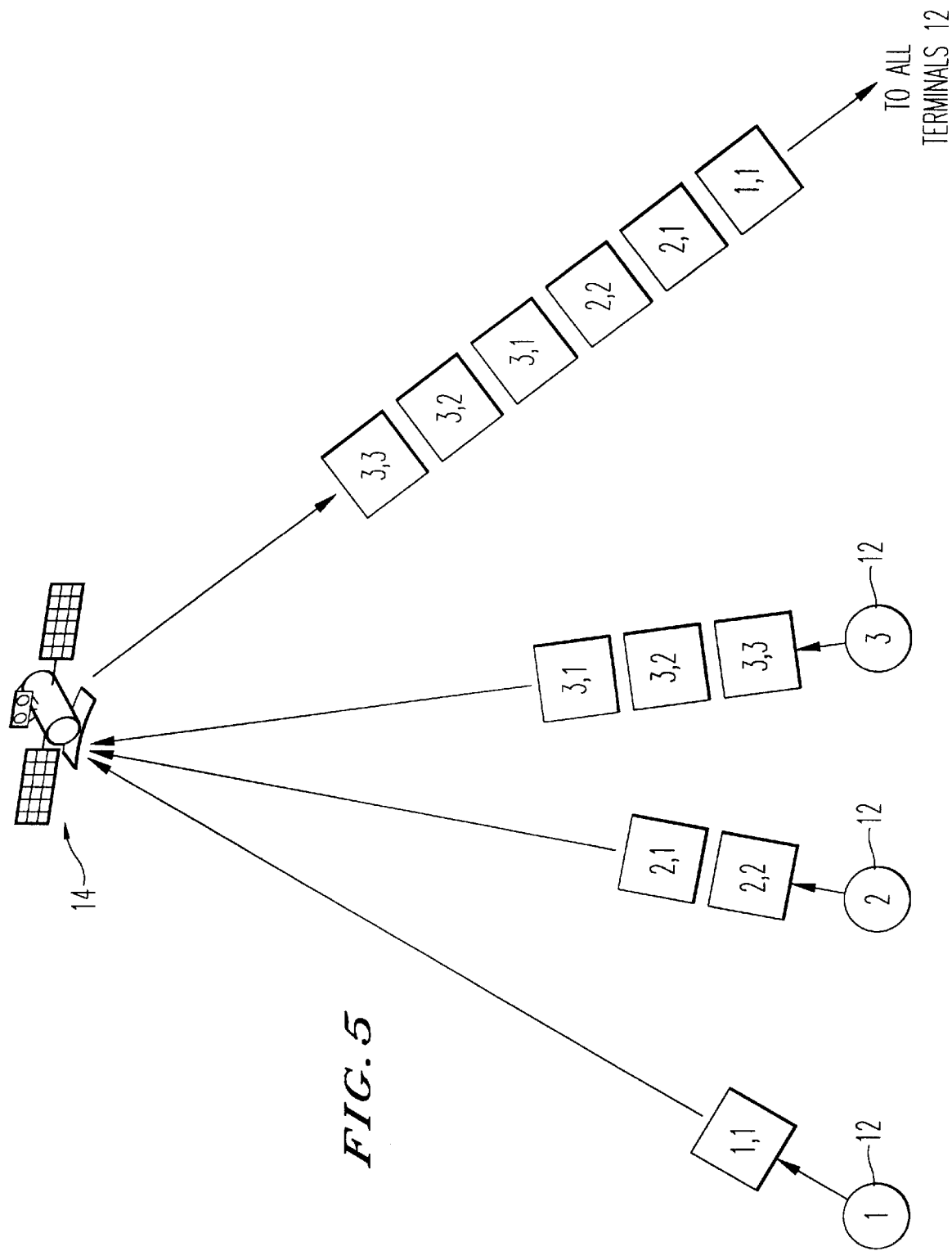
FIG. 5 illustrates the multiplexing of TDMA bursts onto a carrier.

The downlink flow proceeds as follows. Each terminal 12 whose modem 54 is tuned to the carrier receives all bursts transmitted onto the carrier, as illustrated in FIG. 5. The burst consists of the contents of the burst buffer 68, that is, a payload 108 and a header 106 (FIG. 7) which contains information to facilitate the recovery of the burst by the receiving terminals 12. The system 10 of the present invention, however, can work with any one of a number of TDMA schemes insofar as the part of the system 10 that is responsible for the reliable transmission and reception of TDMA bursts.

Referring to FIG. 4, a burst is demodulated in the TDMA modem 54. The demodulated burst is transmitted to the TMC 76 in the PCD 52. The TMC 76 decodes the burst and validates its checksums. If the burst contains a detectable but not correctable error, the burst is discarded, and an error message is recorded. The TMC 76 passes the payload portion 108 of valid bursts to the incoming data queue(s) 65 in the FAD 66.

The FAD 66 preferably performs two levels of filtering on the incoming data from the satellite 14. The FAD 66 incorporates a first level or group filter which classifies the burst into one of three categories: (1) a burst plan received from the terminal 12 operating as the MT; (2) data fragments from a member of its group, wherein a group is a set of terminals 12 that are permitted to communicate with each other; and (3) data fragments from a terminal 12 that is not a member of the group. The terminals 12 can be divided into a number of different groups. Terminals 12 in multiple groups can transmit information to other terminals 12 belonging to their respective groups using the same carrier. To facilitate secure communications between terminals 12 belonging to different groups, the FAD 66 in each terminal stores a table of terminal identification numbers corresponding to those terminals 12 with which that particular terminal is permitted to communicate. As described below, the TDMA overhead bytes 116 in the header 106 of a burst 98 comprises bits for specifying a terminal identifier which uniquely identifies a terminal 12 within the system 10. Thus, when a burst is received via satellite 14 and demodulated, the FAD 66 performs a table look-up operation to determine if the burst is from a sending terminal 12 that is in the same group as the receiving terminal 12, or is from the terminal 12 currently operating as the MT.

The burst plan is stored in each terminal 12 for controlling the creation and output of TDMA bursts. Data in a burst from a group member is retained by a terminal 12 for further processing by the FAD 66. Data in a burst from a terminal 12 outside the receiving terminal's group is discarded.

The FAD 66 assembles the fragments in the payloads 108 of bursts retained by the terminal 12 into the frames from which the fragments were derived using fragmentation overhead bytes. The fragmentation overhead bytes are described in further detail below in connection with FIG. 7. Incomplete frames are discarded, and an error report is generated by the FAD 66 for use by the NMC 13. Each complete frame contains an address, whose form is dependent upon the nature of the frame, as stated previously. In accordance with a second level of filtering, the address is analyzed to determine if it is associated with one of the communications ports 40 attached to the terminal 12. If so, the frame is forwarded by the FAD 66 to the appropriate Frame Handler module (FHM) 64. If the address is not associated with one of the communication ports 40 or the NMM 78 (FIG. 4), the frame is discarded. The FHM 64, using priority queuing, transmits the frame to the appropriate communications port 40. For example, a frame containing time critical information such as voice or video is transmitted to the appropriate port 40 before a frame containing, for example, data that is not time critical. The FHM 64 records statistics regarding the volume of data transmitted by a virtual circuit and a port which are also used by the NMC 13.

Referring to FIG. 4, a network management module (NMM) 78 is connected to the FAD 66 in the PCD 52 of each terminal 12 to provide monitoring, control and accounting functions. The NMM 78 communicates with the NMC 13, which is usually remotely located. Each terminal 12 in a system 10 is preferably managed by the same NMC 13. The NMC 13 preferably uses the Simple Network Management Protocol (SNMP) to communicate with the terminals 12. Communications can be effected over the TDMA link 16, with the NMC 13 operating as one of the terminals 12 in the system 10, or can be effected by a dial-up telephone call over the Public Switched Telephone Network (PSTN).

The NMM 78 receives commands and inquiries from the NMC 13 and transmits messages to the NMC 13. Commands are used to change the state of the system 10 and the terminal 12. For example, one such command can change the value of the CIR at the terminal 12. The NMM 78 decodes the command and sends it to the TMC 76 of that terminal 12, which creates a request for the bandwidth needed to satisfy the CIR. The TMC 76 inserts the request into a portion of the payload reserved for requests for transmission in the next burst allocated to the terminal 12.

With reference to FIGS. 1 and 4, the NMM 78 in each terminal 12 collects statistics based on the error messages and traffic reports generated by the NMMs 78 in other terminals 12, and periodically transmits statistics reports to the NMC 13 via the GT. The GT can be the same terminal 12 as the MT, or it can be a different terminal. The NMM 54 in each terminal 12 can also receive commands and inquiries from a local personal computer (PC) to facilitate system checkout by an onsite technician.

The NMM 78 performs the monitor and control functions for the terminal 12 components shown in FIG. 4 via software modules called agents. Each function or duty executed by the NMM 78 is defined in an agent. For example, agents are provided to support device monitor and control functions such as collecting status, configure and set parameters for the TDMA modem 54 and the RFT unit 56, configuring port 40 speed and routing tables, collecting alarms, resetting the NMM 78 microcontroller and collecting statistics from the PCD 52, and monitoring and controlling customer equipment connected to the terminal 12. The NMM 78 also supports downline loads of new software from the NMC 13.

With reference to FIG. 3, the PCD 52 preferably comprises of number of central processing unit (CPU) boards (not shown). Each CPU board supports different functions. In accordance with an embodiment of the present invention, the frame relay Frame Handler module 42 is supported by a communications CPU board with at least 2.5 Megabytes (M) of digital memory (i.e., 2M for storing incoming and outgoing data streams or bursts, 256 kilobytes (K) for storing downloaded software, and configuration and control data, and 128K for resident software). Other CPU boards support fragment assembly and disassembly, burst buffer assembly and so on. The functions of the CPU boards can vary from implementation to implementation.

The TDMA modem 54 comprises a modulator for modulating a burst onto an intermediate carrier frequency (e.g., 70 Mhz or L-band). QPSK modulation is preferably used, and FEC rates such as R1/2, R3/4 can be selected. The RFT unit 56 comprises an up converter for converting the burst to a satellite carrier in the C-band or Ku-band. In addition, the RFT unit 56 comprises a down converter for converting signals received from the satellite (e.g., 950–1450 Mhz or 11.45–11.95 Gigahertz (Ghz) signals) into the intermediate carrier signal (e.g., 70 Mhz or L-band). The TDMA modem 54 also comprises a demodulator that demodulates a TDMA frame from the intermediate frequency carrier and provides the TDMA frame to a PCD port for storage in an incoming data queue 65.

The burst plan described below operates using a single carrier to transmit bursts. In accordance with another embodiment of the present invention, the burst plan can be expanded in the space domain. A modem can be provided at each terminal 12 to tune to multiple carriers located across the entire satellite link 16. This provides an advantage over single carrier systems by increasing the total TDMA bandwidth available for a system 10, without having to increase carrier bit rate.

The operation of the PCD 52, and the terminal 12 operating as the MT, when implementing the burst plan and the fragmentation protocol will be described with reference to FIGS. 6 and 7. A TDMA frame 96, as shown in FIG. 6, shall be distinguished from a burst 98 (FIG. 7).

The basic unit of time in a TDMA frame 96 is a time slot 99 for carrying network control information or user application data. The duration of a slot 99 can be chosen for the system 10 and stored as a variable network parameter at the NMC 13 (see Table I). In one embodiment of the invention, the length of an individual slot 99 remains constant during network operation, but can be changed by a network management action. The new value for the parameter can be downloaded, for example, from the NMC 13 to each terminal 12 via the satellite link 16, and the system 10 reinitialized to operate in accordance with slots 99 having a new duration.

A selected number of slots 99 constitute a TDMA frame 96 and this number is also stored as a network parameter at the NMC 13 and incorporated into the PCD 52 program code at each terminal 12. A TDMA frame 96 comprises a small fixed assignment subframe 100 and a larger dynamic assignment subframe 102, as shown in FIG. 6. Alternatively, the fixed assignment subframe 100 can be placed before the dynamic assignment subframe 102 in a TDMA frame 96. In the fixed assignment subframe 100, the slots 99 are dedicated to respective terminals 12, that is, a terminal 12 is assigned a particular slot 99 in a frame 96 during which to transmit signals to the satellite 14. The number of TDMA frames 96 required for assigning one slot 99 in the subframe 100 to each terminal 12 in a network 10 is called a TDMA superframe 104. The time duration of the superframe 104 determines the longest possible time it takes a terminal 12 to acquire additional bandwidth. In accordance with one embodiment of the present invention, the terminal 12 operating as the MT is allocated one burst in each fixed assignment subframe 100, preferably the first, so that it can transmit the burst plan once per frame time. The other terminals 12 are each preferably assigned at least one burst per superframe 104 in which to send a bandwidth request and/or a payload with data.

Since the burst plan is transmitted from the MT once per frame, and burst requests can be transmitted from the other terminals 12 at least once per superframe, the system 10 is robust. If the most recent burst plan devised by the MT is not successfully received by a terminal 12, the terminal 12 stops transmission for a relatively short period of time (i.e., typically only the duration of one frame) until the next burst plan is received. Similarly, if transmission of a bandwidth request from a terminal 12 is not successful, the terminal 12 operates with what perhaps is not an optimal amount of bandwidth for a relatively short period of time, that is, until the terminal 12 can generate another bandwidth request within the next superframe, if not sooner.

In the illustrated example in FIG. 6, there are 45 terminals 12, and the dedicated part 100 of a TDMA frame 96 has 10 slots. Thus, five TDMA frames 96 comprising a total of 500 slots constitute a superframe 104. The dynamic assignment subframe 102 comprises a number of slots 99 designated by a network parameter (e.g., 90 dynamically assignable slots per frame) which can be changed. The terminals 12 can acquire these slots 99 by requests sent to the terminal 12 operating as the MT.

With reference to FIG. 7, a burst 98 generated by a terminal 12 comprises overhead bytes 106 and a payload 108, as shown. Following guard bytes 110 and a preamble 112, a burst 98 contains a unique word 114 which supports the synchronization process, TDMA overhead bytes 116 to transmit bandwidth requests, and fragmentation overhead bytes 118. The TDMA overhead bytes preferably comprise the following data:

| | |
|---|---|
| Terminal identifier | 8 bits |
| Master flag indicator | 1 bit |
| Indication for data/burst plan | 1 bit |
| Stream request | 8 bits |
| Queue length request | 8 bits |
| CRC | 16 bits. |

As stated previously, the fragmentation overhead bytes 118 uniquely associate a fragment to the frame from which it was derived. For example, the fragmentation overhead bytes can comprise two bytes for each fragment to identify where in the frame the fragment begins (e.g., the beginning, middle, or end of the frame or constitutes a complete frame), the service class or priority of the fragment including the type of protocol used, and the length of the fragment. The payload 108 of a burst typically comprises both Ethernet and frame relay formatted data. It may also contain other types of frames such as HDLC and SDLC. Fragmentation is a generic format in that it allows these different types of data frames to be transmitted in the same payload 108. Service class or priority is based on the port or the permanent virtual circuit from which the frame was received. Accordingly, when payloads 108 are received at the receiving terminal 12, the fragments are placed in priority queues by the FAD 66 in accordance with their service class, and subsequently into the frames from which they were derived, using the fragment length and frame position information.

Frames in the payload 108 are fragmented to ensure that the burst payload 108 can be efficiently packed (i.e., the payload contains as few null characters as possible), and to prevent oversized fragments from delaying transmission of higher priority fragments such as voice. The fragment size is a system parameter, and is typically set at 64 or 128 bytes.

The burst rate associated with a terminal 12 determines its collective throughput to the other terminals in the system 10. Thus, the more bursts a terminal 12 transmits per second, the higher the throughput. This is illustrated by the following example. Assuming a terminal 12 has a 64 kbps CIR, a burst payload 108 consists of 200 bytes or 1600 bits per burst 98, the terminal 12 is guaranteed by its CIR to be able to transmit data over the satellite link at 64,000/1600 or 40 bursts per second. Assume also that the TDMA frame 96 consists of 100 bursts. These parameters are network parameters that can be changed as described below in connection with Table I.

If the total number of overhead and payload bits in a burst 98 is 2144 and the satellite carrier rate is 2.048 Mbps, then 955 bursts per second can be transmitted in the system 10. Thus, if the number 955 is rounded to 1000, then 100 bursts or one TDMA frame 96 occurs approximately every 100 milliseconds. The terminal 12 in the present example is guaranteed the ability to use 40 of these bursts 98 per second for transmitting voice, video and/or data from its user access devices 42. A terminal 12 with a larger CIR such as 256 kbps is able to transmit 160 bursts 98 of the 955 burst per second capacity of the system 10. The 40 bursts per second rate transmission guaranteed to the terminal 12 with the 64 kbps CIR does not necessarily occur in one TDMA frame 96 but can be spread among several TDMA frames 96. For example, the terminal 12 operating as the MT can allocate 8 bursts per frame in each of the five frames 96 of a TDMA superframe 104 to allow the terminal 12 with the 64 kbps CIR to transmit its 40 bursts. Alternatively, the MT can transmit 20 of the 40 bursts 98 each 0.5 seconds or 20 bursts 98 per each of two superframes 104.

The assignment of bursts 98 within a TDMA frame 96 is determined by the burst plan. The burst plan is determined by the collective needs of the terminals 12 in the system 10. Thus, the burst plan is dynamic, that is, a terminal 12 can request more slots 99 during which to transmit bursts 98 if more bandwidth is required. A terminal 12 can generate a request for more bandwidth based on the detection of a voice call, the detection of an outgoing data queue 63 of data frames awaiting transmission whose size exceeds a threshold, or the receipt of a command from the NMC 13. As stated previously, the burst plan is preferably implemented by one of the terminals 12, which is designated to be the MT. The MT broadcasts the burst plan to all other terminals 12 once per frame 96. The system 10, however, can operate under distributed and decentralized control, as described in further detail below.

The bandwidth reservation process determines how the slots 99 in the dynamic assignment subframe 102 are allocated among the requesting terminals 12. This process, which takes place once per frame 96, is based on requests for two types of bandwidth, that is, permanent throughput and guaranteed throughput.

Permanent throughput of a terminal 12 is the transmission capacity provided by the number of slots 99 per time frame 96 which the terminal 12 has permanently reserved, that is, the slots cannot be reassigned unless the terminal 12 releases them. Permanent throughput is preferably dimensioned such that all non-jitter-tolerant applications are covered. These applications include voice, video and the enhanced CIR (ECIR) for virtual circuits. The ECIR is a premium service which assures that the required bandwidth is always available, in distinction to the conventional CIR service which releases bandwidth that is not being used, as described below. A terminal 12 acquires its permanent throughput by issuing a stream request to the terminal 12 operating as the MT.

Guaranteed throughput supports conventional CIRs, that is, a terminal 12 is assured a specified amount of bandwidth. The terminal 12, however, releases the bandwidth when it is not needed so that the bandwidth can be allocated to other terminals 12. This release of bandwidth is in contrast with the permanent retention of bandwidth associated with permanent throughput. The released bandwidth is returned to the releasing terminal 12 when the releasing terminal 12 needs it. In accordance with an embodiment of the invention, bandwidth is typically returned within approximately one second prior to the time it is needed.

The sum of the guaranteed and the permanent throughputs of all terminals 12 in the system 10 preferably does not exceed the channel or carrier capacity. By entering an associated parameter, a network manager can set the limit for the total channel capacity available for guaranteed and permanent throughput below the maximum channel capacity. A list of guaranteed throughput for every terminal 12 in the system 10 is stored at the MT.

Permanent throughput is assigned in discrete increments (i.e., stream units), depending on the selected size of the slot 99 and length of the frame 96. A given slot 99 size and frame 96 length together result in a certain data rate per slot 99 assignment. If, for instance, one slot 99 contains 200 bytes of user data, and the frame 96 length is 100 ms, then 2000 byte/s or 16 kbit/s can be carried by one slot 99 per frame 96. This value (i.e., streams.per.slot in Table I) is selected by the network manager or operator. A value of 4 in the above example results in a stream unit of 4 kbit/s.

Dynamic throughput is assigned based on the cumulative traffic requests made by the terminals 12. Based on these requests, the terminal 12 operating as the MT creates a burst plan for the TDMA frame 96, in which each slot 99 is associated with one terminal 12, and the slot is classified as either a stream slot, a guaranteed slot, a preemptable slot or a free slot. A stream slot provides a constant throughput for real-time applications, such as voice and video, or for an enhanced CIR. The MT preferably assigns stream slots to the terminals 12 for transmitting real time data before assigning slots for transmitting less time-sensitive data. A guaranteed slot provides a guaranteed minimum throughput, which can be 0 kbps, corresponding to a CIR. When a terminal 12 is assigned the required number of slots to empty its queue 63, provided the terminal 12 does not exceed its guaranteed throughput, the slots are designated as guaranteed slots. These guaranteed slots cannot be preempted until the slots are released by the terminal 12. A preemptable slot, if available, is assigned to a terminal 12 which has a demand that exceeds its CIR or ECIR. Preemptable slots can be reassigned by the MT in later frames, if needed, to satisfy requests for stream and guaranteed slots made by other terminals 12. Free slots are the slots which remain after the other three types of slots have been assigned.

Free slots are preferably assigned equitably to terminals, that is, the MT sequentially provides each terminal 12 with an opportunity to use a number of the free slots. Assigning free slots to terminals 12 is advantageous because it improves terminal access time for making bandwidth requests and minimizes the time delay in acquiring new bandwidth. These free slots can be reassigned by the MT in later frames, if needed, to satisfy requests for stream slots and guaranteed slots, and requests beyond the CIR or ECIR assigned to a terminal 12. In accordance with alternative embodiments, the MT can assign free slots to terminals 12 in proportion to their current number of assigned slots, or in inverse proportion to their current number of assigned slots.

The number of guaranteed slots together with the number of stream slots preferably cannot exceed the number of slots in the dynamic assignment subframe 102. Requests for additional stream slots or guaranteed slots that exceed this limit are rejected by the terminal 12 operating as the MT.

In accordance with the software provided in each terminal 12 for generating a burst plan when that terminal 12 is designated to be the MT, a terminal 12 operating as an MT first assigns as many slots to each terminal 12 as required to empty that terminal's outgoing data queue 63 within one TDMA frame 96. At a minimum, the guaranteed slots are assigned. If the queue 63 length is greater than the number of guaranteed slots, free slots are also assigned. If there are not enough free slots to satisfy the totality of requests made by the terminals 12, the MT assigns the available free slots, as well as preemptable slots on a pro rata basis, in proportion to the queue length of each terminal 12.

The burst plan is preferably transmitted in a burst 98 generated by the terminal 12 operating as the MT during the first slot 99 of the fixed assignment subframe 100 of every TDMA frame 96. The payload 108 of the burst containing the burst plan can be formatted, for example, to have one or more bytes corresponding to each slot 99 in the dynamic assignment subframe 102 which are arranged sequentially. These byte(s) comprise the terminal identification number of the terminal 12 to which the slot is assigned, and a number of bits to identify the classification of the slot (i.e., whether or not it is a stream slot, a guaranteed slot, a preemptable slot or a free slot). The TDMA overhead bytes 116 in the header 106 of the burst 98 containing the burst plan comprises master flag and data/burst plan bits to indicate that the burst is from the terminal 12 designated as the MT, is intended for use by all of the other terminals 12, and contains the burst plan. Thus, when the other terminals receive the burst with the burst plan, the terminals can store the burst plan. The new burst plan is executed N frames after its transmission from the MT, where N is sufficient large to cover the satellite propagation delay of the terminal 12 with the greatest distance to the satellite 14. Thus, terminals 12 that are closer to the satellite 14 do not execute the burst plan prematurely.

Bandwidth request messages sent by the terminals 12 and burst plans transmitted by the terminal 12 designated as the MT are supported by a cyclical redundancy check (CRC). Thus, the receiving terminal 12 can determine whether or not the transmission was error free. If an error occurred, the request or burst plan message is ignored. Because a terminal 12 can transmit bandwidth request and release messages at each burst 98, it is not necessary for the sending terminal 12 to be specifically aware of the MT having not received its message. The impact of a lost bandwidth message is minimal since a new bandwidth message is transmitted in the next burst 98 assigned to that terminal 12. Since the complete burst plan is transmitted by the MT in every TDMA frame 96, the impact of a lost burst plan is temporary, that is, usually only one frame 96 time. However, if a terminal 12 does not receive a burst plan correctly, it ceases transmission for one frame to eliminate the possibility that it will transmit a burst at the wrong time.

The terminal 12 designated as the MT monitors when the other terminals 12 became inactive, among other functions. If, after a specified number of frames 96, no burst 98 from a terminal 12 is received, the terminal 12 is declared to be malfunctioning and its reserved slots 99 are released for use by other terminals 12.

The significant parameters used in the generation of a burst plan are listed below. The type of each parameter is indicated according to the following categories: selectable by the operator (sel); derived from selected parameters (der); changes dynamically during runtime (run); a parameter used by the terminal 12 operating as the manager terminal (mgr); a network parameter that is the same for every terminal 12 in the system or network 10 (net); and a terminal 12 parameter that is unique to a particular terminal or earth station (sta). In addition, Table I indicates for each parameter whether or not it is a management information base (MIB) parameter (i.e, readable only (r), readable/writable (r/w), or is not a MIB parameter at all (no)), and whether or not the parameter needs to be initialized from a parameter file (yes/no). A MIB is preferably stored at each terminal 12. Some parameters, which are noted in parentheses, are elements of a list which uses the terminal identifier described above in connection with the TDMA overhead bytes 116 as an index.

TABLE I

BURST PLAN PARAMETERS

| No. | Name | Type | MIB | Init | Meaning |
|---|---|---|---|---|---|
| 1 | network.size | sel/mgr | r/w | yes | number of terminals 12 in the network 10 |
| 2 | frame.length | sel/mgr | r/w | yes | number of slots 99 per frame 96 |
| 3 | super.frame | sel/mgr | r/w | yes | number of frames 96 per superframe 104 |
| 4 | stream.max | sel/mgr | r | yes | maximum number of stream slots per frame 96 |
| 5 | guar.thrp | sel/mgr | r | yes | guaranteed throughput of each terminal 12 (slots 99 per frame 96) |
| 6 | packet.length | sel/net | r | yes | slot 99 length expressed in number of user bytes |
| 7 | streams.per.slot | sel/net | r | yes | number of stream units per slot |
| 8 | modulation | sel/net | r | yes | BPSK or QPSK modulation |
| 9 | coded | sel/net | r | yes | forward error correction |
| 10 | data.rate | sel/net | r | yes | user data rate |
| 11 | unique.word | sel/net | r | yes | unique word |
| 12 | assemble.delay | sel/net | r | yes | time span to announce slot before transmission |
| 13 | MCT | sel/sta | r/w | yes | selects MT role |
| 14 | own.address | sel/sta | r/w | yes | own station address |
| 15 | rtt | sel/sta | r | yes | satellite 14 round trip time |
| 16 | uw.threshold | sel/sta | r/w | yes | unique word detection threshold |
| 17 | slot.empty.th | sel/sta | r/w | yes | slot 99 empty threshold |
| 18 | fix.ass. subframe | der/mgr | r | no | number of slots 99 per fixed assignment subframe 100 |
| 19 | dyn.ass. subframe | der/mgr | r | no | number of slots 99 per dynamic assignment subframe 102 |
| 20 | guar.thrp.tot | der/mgr | r | no | total sum of guaranteed throughput (slots per frame) |
| 21 | busy.tot | der/mgr | r | no | total sum of reserved slots per frame 96 |
| 22 | tx.rx.delay | der/net | r | no | number of frames 96 between transmission of burst plan and transmission of corresponding frame 96 |
| 23 | slot.length | der/net | r | no | slot length expressed in fs |
| 24 | data.rate. per.slot | der/net | r | no | data rate per slot assignment |
| 25 | actual.thrp | run/mgr | r | no | number of slots currently reserved by each |

TABLE I-continued

BURST PLAN PARAMETERS

| No. | Name | Type | MIB | Init | Meaning |
|---|---|---|---|---|---|
| 26 | stream.slots | run/mgr | r | no | terminal 12 current number of stream slots per terminal 12 |
| 27 | site.up | run/mgr | r | no | status of terminal 12 (up/down) |
| 28 | queue.length | run/sta | no | no | current length of data queues 63 |
| 29 | crc.error | run/sta | r | no | header CRC error |
| 30 | slot.synch | run/sta | r | no | slot synchronization acquired/lost |
| 31 | frame.synch | run/sta | r | no | frame synchronization acquired/lost |
| 32 | myself.heard | run/sta | r | no | own bursts received |
| 33 | dispatcher.slow | run/sta | r | no | dispatcher failed to respond within assemble.delay |
| 34 | tx.mod.slow | run/sta | r | no | burst late for transmission |
| 35 | rx.mod.slow | run/sta | r | no | receiver too slow |

As mentioned previously, the slot 99 assignment procedure and scheduling for the next transmit frame 96 is performed by the terminal 12 currently operating as the MT; however, in an alternative embodiment of the present invention, the slot assignment procedure can be performed under distributed and decentralized control by each terminal 12. Bandwidth messages with requests for additional bandwidth, releases of slots and data queue information are broadcast by each terminal 12 to all other terminals 12. Each terminal 12 determines the burst plan. The burst or transmission plan is processed by the PCD 52 in each terminal 12 frame-by-frame, that is, one complete received frame 96 is evaluated and, based on this information, the next frame 96 to be transmitted is computed. Every terminal 12 preferably applies the same rules as described above such that all of the terminals 12 create the same burst plan, provided they receive the same information (i.e., no byte errors occur).

If a terminal 12 in a distributed and decentralized control-type system receives a burst with an error in the portion containing a request, or a terminal 12 has completely failed to detect a burst 98 in a slot 99 which is assumed to be not empty, then the terminal 12 is potentially out of synchronization. There is an uncertainty period of one satellite delay. After this time period, the terminal 12 detects whether it has missed slot requests or releases and adjusts its scheduling, accordingly. During this uncertainty period, the terminal 12 which has missed reservation information could cause data collisions amongst slots 99 in a frame 96. Collisions are minimized by the terminal 12 indicating in its header 106 whether or not it transmitted a slot reservation change in its previous slot. If a terminal 12 misses a burst and receives the next burst from the related terminal 12 correctly, it can at least determine whether it has missed a reservation change. As a consequence, the terminal 12 refrains from transmitting during those slots which may cause data collision. Collisions generally only occur in slots for which the terminal 12 has no reservation, or has made reservations which have been received during the time the terminal 12 is out of synchronization.

In accordance with the illustrated embodiment, every terminal 12 has the software necessary to operate as the MT when designated to do so. The software designates which of the terminals 12 is to be the MT in accordance with a rule such as, for example, designating the terminal 12 with the lowest terminal identifier to be the MT. If the terminal 12 with the next highest terminal identifier does not receive bursts from the MT after a predetermined period of time has elapsed, this other terminal 12 assumes the role of MT by broadcasting a message to all of the terminals 12. The terminal 12 formerly operating as the MT can send a message acknowledging the terminal 12 currently operating as the MT, and synchronize to this terminal, provided the old terminal 12 is still functional.

The system 10 is advantageous because it employs statistical multiplexing within each terminal 12 and between terminals 12 to provide cost effective sharing of the satellite link 16. The burst buffer 68 in each terminal 12 allows bandwidth sharing within a terminal 12. All data streams share the burst buffer 68 regardless of whether they contain voice, video or data. As stated previously, the system 10 uses a priority scheme to fill the burst buffer 68 to capacity as much as possible. Statistical multiplexing occurs within a terminal 12 because not all permanent virtual circuits (PVCs) and voice calls are constantly busy. Thus, the system 10 uses silence intervals in voice conversations, which are detected by the voice multiplexer 62, to transmit lower priority data packets, thereby increasing the effective bandwidth available for data. The system 10 also takes advantage of the bursty nature of data in a multi-LAN environment. A terminal 12 can multiplex data from one Ethernet LAN and a number of router-based LANs. The data frames can, in turn, be statistically multiplexed with voice frames in the burst buffer 68.

Bandwidth sharing also occurs among terminals 12 since a common pool of network bandwidth potentially available for use by every terminal 12 is maintained by the terminal designated to be the burst plan manager terminal. A terminal 12 uses virtual circuits of differing data rates and quality of service to support voice, including analog facsimile, video and data applications. A terminal provides the capability to assign a fixed and guaranteed bandwidth (i.e., a CIR) to a PVC, port 40 or a terminal 12. The PVC CIR is analogous to the CIR service offered by terrestrial providers. It defines bandwidth available on a point-to-point connection defined by the PVC. The only limit to achieving throughput equal to the CIR is the capability of the receiving user applications to support the data rate.

Port and terminal CIRs are distinguished from a conventional PVC CIR in that they define point-to-multipoint throughput. The port CIR is a guaranteed bandwidth from the port 40 of a terminal 12 to any set of compatible ports 40 in the system 10. A terminal CIR is a guaranteed bandwidth from a terminal 12 to any set of terminals 12 in the system 10. As with the PVC CIR, the collective recipients of the data need to be capable of receiving data at the transmitted rates. CIRs are typically available between 16 Kbps and 512 Kbps. A terminal CIR is offered at two levels of quality of service. A standard terminal CIR guarantees that bandwidth is available when needed, but is released when not needed. The released bandwidth is available for use by other terminals 12. The enhanced CIR (ECIR) guarantees bandwidth to always be available whether the user needs it or not. The ECIR service is useful for applications in which no delay or delay variation can be tolerated.

A terminal 12 with relatively low bandwidth demand can release its bandwidth for use by other terminals 12 requiring more capacity. If standard CIR service is used, even the bandwidth associated with a constant bit rate (CBR) service can be released to the common pool maintained by the terminal 12 operating as the MT if the CBR service terminal 12 is not using the bandwidth. In such cases, a terminal 12 with lower priority, but momentarily demanding throughput needs, can borrow the bandwidth from the common pool. The borrowed bandwidth is subsequently returned to the lending terminal 12 when needed. Thus, a user can achieve higher burst rates without having to pay for a CBR service equal to the desired burst rate.

Figure 8:
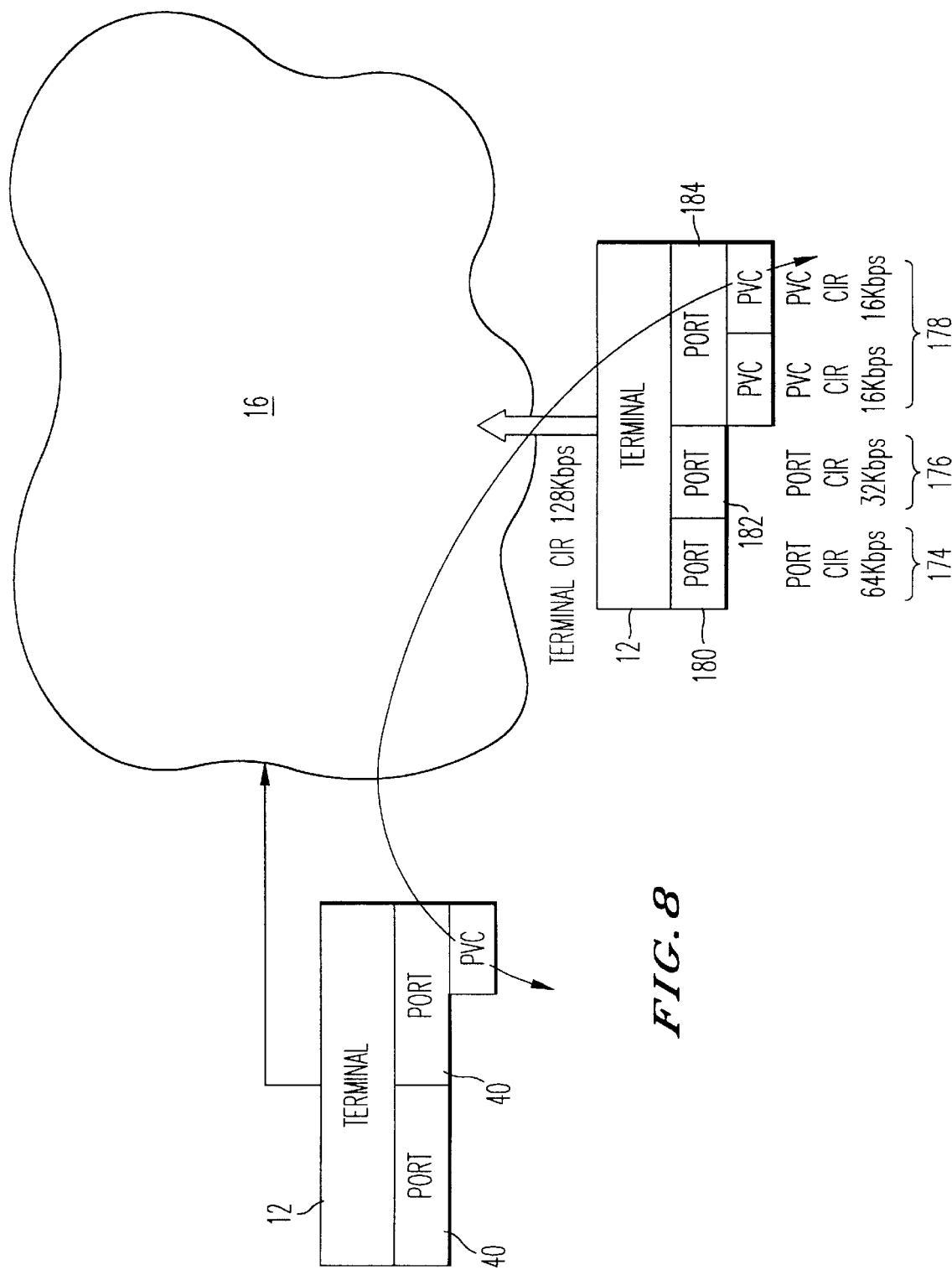
FIG. 8 illustrates the use of committed information rates in the system depicted in FIG. 1 in accordance with an embodiment of the present invention.

Each terminal 12 in the system 10 employs the fragmentation protocol and burst plan described above, as well as the PVC, port and terminal CIRs, to control the access of user access devices 42 to the satellite link 16. For example, three users 174, 176 and 178 in FIG. 8 can purchase 64 kbps CBR service, 32 kbps CBR service and 32 kbps CBR service, respectively. The users can be connected to three respective terminal ports 180, 182 and 184 using, for example, 256 kbps physical links. The terminal CIR for the terminal can be 128 kbps for illustrative purposes. The PCD 52 in the terminal 12 controls the access of these users to the satellite link 16 via their respective ports. If the user 174 needs additional bandwidth beyond its 64 kbps CIR, the terminal 12 can allow the user 174 to transmit bursts at 128 kbps because of its ability to ensure that the other input generators (i.e., users 176 and 178) do not transmit bursts at the same time. This function of the system 10 is advantageous over conventional frame relay systems which are not able to prevent congestion when users require greater bandwidth. When the user 174 transmits more than the conventional, assigned PVC CIR in a conventional frame relay system, the user can receive congestion flags in return packets indicating data was lost due to congestion created by other users' demands on the network.

In accordance with yet another aspect of the present invention, a billing procedure is used to bill users for voice or video based on the number of minutes on a PVC, for data based on the number of bytes actually sent over the subscribed information rate, as well as for the basic fee for the subscribed rate. Further, the system 10 provides users with a number of different services including a CIR, an ECIR, an excess information rate (EIR), an available bit rate (ABR), also known as a Zero CIR, a scheduled CIR, and a scheduled ECIR, although other services can be offered.

As stated previously, CIR service guarantees a user a fixed data rate to transmit information via a terminal 12 over the satellite link 16 at all times. The CIR can be allocated to the terminal 12 itself, to the port 40 to which the user access device 42 is connected, or to the PVC the user uses to communicate with the terminal 12. The user pays a CIR service fee based on the data rate. An EIR service can be purchased to obtain additional bandwidth to transmit traffic in excess of the CIR, subject to the availability of bandwidth within the system 10 as determined by the burst plan. Excess traffic is billed by the number of excess traffic bytes transmitted, in addition to the CIR service fee. The definition of excess traffic can be set as a system parameter, identifying the time frame over which the EIR measurement is made.

Voice and video can be transmitted over the satellite link 16 via a terminal 12. Unlike known frame relay systems, the system 10 accommodates voice within the CIR. The user is billed a fixed price for the CIR. The system 10 does not assign bandwidth outside of the terminal CIR to accommodate telephone calls. In all cases generally, a voice data stream is given priority over data, an advantage not available in known frame relay systems which use voice multiplexers connected to the frame relay and do not give voice data streams priority.

Video channels typically require 64 to 384 Kbps. In the system 10, video can be provided over the satellite link 16 via a PVC, port 40 or terminal 12 with sufficient ECIR to ensure that video quality is preserved. Video channel services can also be provided as a scheduled ECIR service. Unlike terrestrial systems, the system does not require additional bandwidth to support multi-party video conferences. The inherent broadcast nature of the satellite 14 enables the data stream from each party to be seen by each other party in the system 10. There is no need to replicate the data stream, or to use a multiparty conferencing unit (MCU), as is necessary in more conventional implementations of video conferencing.

If the user selects an ABR, the user is not guaranteed any bandwidth on the system 10, that is, the requested data rate is allocated based on the availability of network bandwidth. The terminal 12 operating as the MT is programmed to provide an ABR service user with the requested bandwidth, or at least part of it, within a predetermined time period. The user is billed by the number of bytes which were actually transmitted through the network. This data service is also called a Zero-CIR service. Billing rates can be established on a time of day or other basis, incorporating volume discounts.

Figure 9:
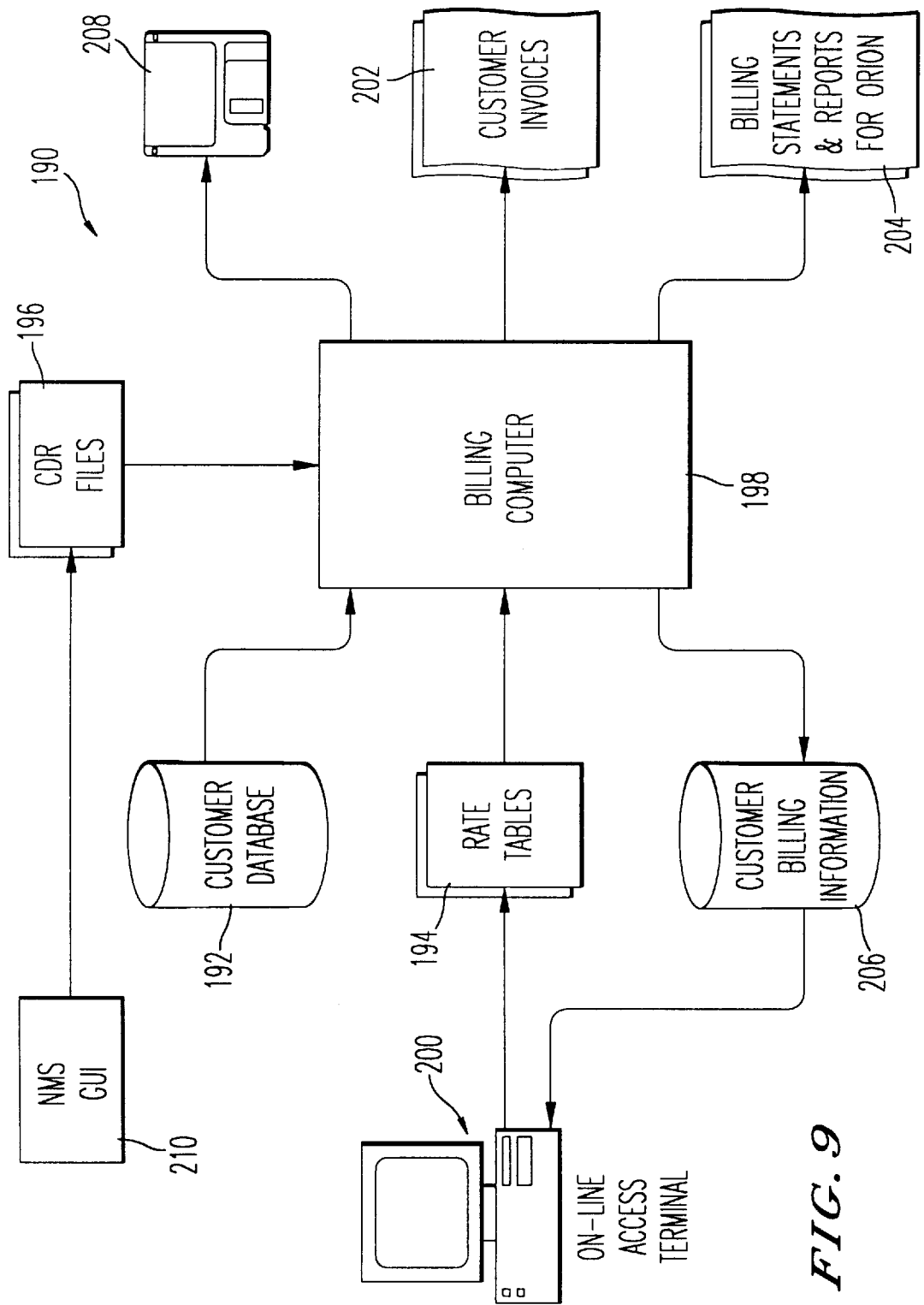
FIG. 9 is a schematic block diagram illustrating a billing system for use with the system depicted in FIG. 1 and constructed in accordance with an embodiment of the present invention.

A billing system 190 for the system 10 comprises a customer database 192 for storing customer account information, rate tables 194 to store standard and special rate information, call detail records (CDR) files 196 and a computer 198 for running a billing program, as shown in FIG. 9. The billing program can be operated from one of the terminals 12, a computer at the NMC 13, or a stand alone or other networked computer.

An on-line access terminal 200 is preferably provided to configure customer accounts and update rate tables. CDRs are preferably provided to the billing system 190 either in real time or as CDR files at the end of a billing cycle by the NMC 13. The billing program is used to generate customer invoices 202, billing statements and reports 204 for the network provider. The billing information is stored in a database 206 for on-line access by the provider and can be used to generate account receivable records 208 which can be stored on magnetic media, for example, for use by the network provider. The NMC 13 is preferably provided with a graphic user interface (GUI) 210 or equivalent console which is programmed to employ a graphical user interface based on, for example, X Window software to create a series of windows and screens for guiding an operator through network management and control operations. In addition to billing and accounts review processes, an operator can use the GUI 210 to obtain performance measurements and statistics for voice and data along virtual circuits to generate standard and customized reports, to alter network parameters and to partition the network as needed. The GUI can generate screens displaying a map of all terminals 12 in the system 10, status and configuration of the entire system, as well as status of each terminal port 40 in the system 10. Once the system 10 is defined, information is stored in configuration database files.

Regarding the billing system 190, the customer database 192 is a repository for maintaining customer account information including general account information, such as customer name, address, customer contact and other information regarding preferred language and currency, customer network configuration information and subscription information. A customer network generally comprises two or more terminals 12, and each terminal 12 therein is configured with several user access ports 40 (e.g., voice, video, frame relay, asynchronous/synchronous data and Ethernet). A user access port 40 is preferably uniquely identified by a network user identifier (NUI). The NUI can be an end point of a PVC identified by a terminal identification number, a port identification number and, for example, a data link connection identifier (DLCI), an Ethernet port identified by the terminal and port identification numbers, or a voice or data port identified by terminal, port and multiplexer port identification numbers. Subscription information generally includes services subscribed for by the customer, such as CIR on a PVC, EIR on a PVC, data by bytes on Ethernet, PVC or auxiliary data ports, voice by minutes across a port or terminal or PVC, among other services described above.

The rate tables 194 comprise flat rates, usage rates for voice data and video services, promotional rates and customized rate tables according to countries or customer accounts. Flat rates can include, for example, access fees for a terminal or port, installation fees, maintenance fees, administration fees, or other services for which a flat rate is charged. Rates for voice calls are preferably specified in minutes on a bill. Two sets of rates for voice calls are provided based on the quality of calls such as calls using 8 or 16 Kbps circuits. The rates also vary, depending on whether voice calls are prime or non-prime time calls. Data services are billed by CIR and EIR. Rate tables for CIR services support multiple data rates between 0 Kbps to T1 rates. The EIR rates are based on the CIR as a base price, and then vary according to the block of kilo-characters (Kchar) transmitted provided bandwidth was available. For example, EIR rates for a 9.6 Kbps CIR differ from that of a T1 CIR for the same amount of access bandwidth used. The access bandwidth is billed based on blocks of kilo-characters. The EIR rates also take into account the time of day (i.e., prime and non-prime hours). Video services are specified on a bill in terms of minutes and factor in time of day. Customized rate tables can be created by operators to accommodate operating costs in different countries or to extend advantages to preferred customers. Customized rate tables reflecting promotional rates can also be used in lieu of default rate tables.

The NMC 13 is programmed to collect call accounting data from terminals 12 and to prepare CDRs containing actual network usage information for each user access port 40. CDRs preferably contain source NUI identified using terminal, port and multiplexer port identification numbers, time of day, destination NUI identified by terminal port and multiplexer port identification numbers, call duration in minutes, as well as number of EIR bytes sent where applicable. For an Ethernet port, CDRs also contain source NUI identified by terminal and Ethernet port identification numbers, as well as time of day and number of bytes sent.

The billing system 190 uses the customer database 192, the rate tables 194 and the CDR files 196 to generate customer invoices 202. Customer invoices prepared by the network provider or a separate billing services provider preferably comprise a fixed portion and an usage portion. The fixed portion includes recurring access fees based on the number of customer sites and carrier rate, an installation fee, a maintenance fee and any other optional service fee of the provider. The usage portion 212 lists detailed call information for each of the user access ports. For frame relay PVCs, the usage portion of an invoice contains the NUI, source and destination end point identification (e.g., site number, interface port and DLCI), the subscribed CIR service, the CIR price calculated according to the CIR rate tables and EIR details such as date, prime and non-prime hour kilo- characters sent, as well as prime and non-prime hour prices and the total price.

An example of a frame relay portion of an invoice is depicted in FIG. 10. An Ethernet portion on an invoice is shown in FIG. 11. The usage portion 214 of an invoice for an Ethernet port is similar to that of a frame relay PVC. The Ethernet port is identified by its NUI, and terminal and port identification numbers. As shown in FIG. 12, the usage portion 216 of an invoice for voice channel identifies the voice channel using an identification number for a multiplexer port, as well as for the NUI end terminal 12 and terminal port 40. The invoice contains information such as date and time of call, destination NUI, terminal and multiplexer port identification numbers, duration of a call in minutes or seconds, whether the call is a prime or non-prime call and the price. Using general account information, the billing system 190 can generate invoices in different currencies and support currency conversion as well as generate invoices in various languages.

The on-line access terminal 200 of FIG. 10 can be used for service order processing such as viewing and modifying customer account information, customer network configuration and customer subscription information. An operator can use the on-line access terminal 200 to view and modify rate tables, create new rate tables by country and by customer accounts, establish new promotional rate tables as well as specify effective dates for rate tables. In addition to reviewing customer bills to verify customer accounts and respond to billing related queries for customers, an operator can use the on-line access terminal 200 to apply credits or debits to customer accounts due to rate changes, billing errors or special discounts.

An important difference between the system 10 described herein and earlier full mesh systems that use single channel per carrier (SCPC) is how a terminal 12 accesses the space segment 16. TDMA/DAMA terminals 12 share a common carrier or set of carriers. An SCPC system, in distinction, uses a dedicated carrier for each node. To achieve full mesh connectivity, each SCPC node must receive the carrier from each other node. This means that each SCPC node must have one modulator and n−1 demodulators, where n is the number of nodes in the network. The system 10, on the other hand requires only one modem per node, regardless of how many nodes there are in the system 10.

Since an SCPC system carrier is dedicated to and continually uplinked from a node, the satellite bandwidth assigned to one node cannot be used by another node. In the system 10, on the other hand, bandwidth can be dynamically assigned according to the demand at each terminal 12. This is a fundamental benefit of terminals 12 compared to SCPC nodes. Bandwidth is more efficiently allocated in the system 10. This bandwidth sharing mechanism also provides a basis for usage based billing, since multiple customers share the same bandwidth. An SCPC system does not provide a basis for usage-based billing since the network resources must be dedicated to a single customer.

An SCPC system such as that disclosed in U.S. Pat. No. 5,434,850, to Fielding et al, uses frame relay to broadcast data and voice over a satellite link. The system 10 disclosed herein uses a cell-based protocol which allows more effective transmission of time critical information such as voice and video. The system disclosed in Fielding et al. patent supports a four level priority scheme based on DLCI. The system 10 supports more levels of priority in the data area, by means of its ability to support CIRs for the virtual circuits. The Fielding system does not support CIRs.

The system 10 can support networks of 256 nodes, for example, and more. An SCPC system is limited in a practical sense to 5 to 10 nodes. Each SCPC node must support a demodulator for each other node in the network. In a large network, the number of demodulators at each SCPC node increases cost, physical space requirement, and power requirements to the point where the system is impractical to implement. Also, as the number of carriers increases, the SCPC system space segment cost increases relative to that of the disclosed system. This is because each SCPC node must be sized to its peak bandwidth requirements. There is no statistical multiplexing between SCPC nodes. In contrast, the more terminals 12 used in the system 10, the greater the satellite bandwidth efficiency, since the TDMA/DAMA allocation scheme supports statistical multiplexing between nodes.

The system 10 can determine when voice and video calls are placed and terminated. This information is used for billing and dynamic bandwidth allocation. An SCPC system does not analyze voice calls, since there is no benefit to be derived from doing so. The concept of usage-based billing does not exist, since an SCPC system is inherently a dedicated, full-time service offering.

While certain advantageous embodiments have been chosen to illustrate the invention, it will be understood by those skilled in the art that various changes and modifications can be made herein without departing from the scope of the invention as defined in the appended claims.

What is claimed is:

1. A satellite communication system providing full mesh connectivity among a number of earth terminals via a satellite, the earth terminals being connected to user access devices to receive and transmit at least one of voice, video and other data, each of said terminals comprising:

a processor having a digital memory device and a plurality of ports for connecting to said user access devices, said processor being operable to generate bursts using data received from said user access devices for transmission via the satellite, and to process data received via the satellite and addressed to one of said user access devices for transmission to said user access device;

a modem connected to said processor for modulating said bursts onto radio frequency modulated signals and demodulating downlink carrier signals received from the satellite; and a radio frequency transceiver connected to said modem for converting said modulated signals to an uplink carrier signal for broadcast to each of said earth terminals via the satellite, and for converting said downlink carrier signals to corresponding modulated signals, respectively;

wherein said processor is programmable to organize said bursts in at least one of a plurality of slots constituting a time division multiple access frame, one of said terminals to which said processor corresponds having access to a selected number of said slots to increase or decrease the rate at which said one of said terminals transmits said bursts via the satellite, said selected number of slots being dynamically variable in accordance with a burst plane stored in said digital memory for assigning said slots in said frame to each of said terminals, said slots being dynamically assignable among said terminals in accordance with said burst plan, said dynamically assignable slots being assigned to respective ones of said terminals based on their respective bandwidth requirements.

2. A satellite communication system as claimed in claim 1, wherein one of said terminals is programmable to operate as a manager terminal and the remaining ones of said terminals are each programmable to generate and transmit bandwidth messages to said manager terminal relating to the bandwidth required by said terminal, said manager terminal being programmed to generate said burst plan for assigning said slots in said frame to respective ones of said terminals in accordance with said bandwidth messages, said digital memory device in each of said terminals comprising a plurality of data queues for storing data received from corresponding ones of said plurality of ports, each of said terminals being programmable to monitor a corresponding said plurality of queues, said bandwidth messages comprising data relating to the lengths of said data queues and to the type of data received from corresponding ones of said plurality of ports, said type of data selected from the group consisting of voice, video and other data.

3. A satellite communication system as claimed in claim 1, wherein each of said terminals is programmable to store data relating to the amount of data received at each of said plurality of ports, and the type of data selected from the group consisting of voice, video and other data, said burst plan being determined using said stored data.

4. A satellite communication system providing full mesh connectivity among a number of earth terminals via a satellite, the earth terminals being connected to user access devices to receive and transmit at least one of voice, video and other data, each of said terminals comprising:

a processor having a digital memory device and a plurality of ports for connecting to said user access devices, said processor being operable to generate bursts using data received from said user access devices for transmission via the satellite, and to process data received via the satellite and addressed to one of said user access devices for transmission to said user access device;

a modem connected to said processor for modulating said bursts onto radio frequency modulated signals and demodulating downlink carrier signals received from the satellite; and a radio frequency transceiver connected to said modem for converting said modulated signals to an uplink carrier signal for broadcast to each of said earth terminals via the satellite, and for converting said downlink carrier signals to corresponding modulated signals, respectively;

wherein said processor is programmable to organize said bursts in at least one of a plurality of slots constituting a time division multiple access frame, one of said terminals to which said processor corresponds having access to a selected number of said slots to increase or decrease the rate at which said one of said terminals transmits said bursts via the satellite, said selected number of slots being dynamically variable in accordance with a burst plan stored in said digital memory for assigning said slots in said frame to each of said terminals, said slots being dynamically assignable among said terminals in accordance with said burst plan, said dynamically assignable slots being assigned to respective ones of said terminals based on their respective bandwidth requirements, said burst plan being generated and transmitted to said terminals with the occurrence of each said frame.

5. A satellite communication system as claimed in claim 4, wherein said slots are of fixed duration.

6. A satellite communication system as claimed in claim 4, wherein said slots assigned to one of said terminals can be nonconsecutive within said frame.

7. A satellite communication system as claimed in claim 4, wherein one of said terminals is programmable to operate as a manager terminal and the remaining ones of said terminals are each programmable to generate and transmit bandwidth messages to said manager terminal relating to the bandwidth required by said terminal, said manager terminal being programmed to generate said burst plan for assigning said slots in said frame to respective ones of said terminals in accordance with said bandwidth messages.

8. A satellite communication system as claimed in claim 4, wherein each of said terminals is programmable to generate and transmit bandwidth messages to all other ones of said terminals, and to generate said burst plan to determine which of said slots in said frame are assigned to said terminal using said bandwidth messages from all of said terminals.

9. A satellite communication system as claimed in claim 4, further comprising a manager terminal programmable to receive bandwidth messages generated and transmitted by said terminals, and to generate said burst plan to determine which of said slots in said frame are assigned to each of said terminals using said bandwidth messages.

10. A satellite communication system as claimed in claim 4, wherein data received from respective ones of said user access devices is formatted into frames, said processor being programmable to divide said frames into fragments and to place said fragments in different ones of said bursts.

11. A satellite communication system as claimed in claim 10, wherein said processor is programmable to prioritize said frames from different ones of said user access devices for placement in said bursts, and to generate said bursts by filling said burst with said fragments from said frame having the highest priority before filling in the remainder of said burst with said fragments from said frames having less priority.

12. A satellite communication system as claimed in claim 11, wherein said step of assigning each of said terminals a variable number of slots further comprises the step of classifying as many of said slots in said first slot class as necessary to transmit bursts comprising data requiring transmission with minimal delay.

13. A satellite communication system as claimed in claim 12, wherein said step of assigning each of said terminals a variable number of slots further comprises the step of classifying a number of said slots in said frame which are not in said first slot class in said second slot class to transmit said bursts comprising data that is less sensitive to transmission delay as said slots in said first slot class.

14. A satellite communication system as claimed in claim 12, wherein said step of assigning each of said terminals a variable number of slots further comprises the step of classifying said slots which remain unassigned to said first slot class or said second slot class as free slots and to selectively assign said free slots to said terminals in accordance with a method selected from the group consisting of assigning said free slots equally among said terminals, assigning said free slots in proportion to said number of said slots currently assigned to each of said terminals, and assigning said free slots in inverse proportion to said number of said slots currently assigned to each of said terminals.

15. A satellite communication system providing full mesh connectivity among a number of earth terminals via a satellite, the earth terminals being connected to user access devices to receive and transmit at least one of voice, video and other data, each of said terminals comprising:

a processor having a digital memory device and a plurality of ports for connecting to said user access devices, said processor being operable to generate bursts using data received from said user access devices for transmission via the satellite, and to process data received via the satellite and addressed to one of said user access devices for transmission to said user access device;

a modem connected to said processor for modulating said bursts onto radio frequency modulated signals and demodulating downlink carrier signals received from the satellite;

a radio frequency transceiver connected to said modem for converting said modulated signals to an uplink carrier signal for broadcast to each of said earth terminals via the satellite, and for converting said downlink carrier signals to corresponding modulated signals, respectively;

wherein said processor is programmable to organize said bursts in at least one of a plurality of slots constituting a time division multiple access frame, one of said terminals to which said processor corresponds having access to a selected number of said slots to increase or decrease the rate at which said one of said terminals transmits said bursts via the satellite, said selected number of slots being dynamically variable in accordance with a burst plan stored in said digital memory for assigning said slots in said frame to each of said terminals, said slots being dynamically assignable among said terminals in accordance with said burst plan, said dynamically assignable slots being assigned to respective ones of said terminals based on their respective bandwidth requirements; and a manager terminal programmable to receive bandwidth messages generated and transmitted by said terminals, and to generate said burst plan to determine which of said slots in said frame are assigned to each of said terminals using said bandwidth messages, said manager terminal being programmable to dynamically classify each slot as one of first and second slot classes, said first and second slot classes allowing for at least first and second levels, respectively, of prioritization for assigning said slots to said terminals.

16. A satellite communication system as claimed in claim 15, wherein said manager terminal is programmable to classify as many of said slots in said first slot class as necessary to transmit said bursts comprising data requiring transmission with minimal delay.

17. A satellite communication system as claimed in claim 16, wherein said manager terminal is programmable to classify a number of said slots in said frame which are not in said first slot class in said second slot class to transmit said bursts comprising data that is less sensitive to transmission delay as said slots in said first slot class.

18. A satellite communication system as claimed in claim 17, wherein said manager terminal is programmable to classify said slots which remain unassigned to said first slot class or said second slot as free slots and to selectively assign said free slots to said terminals.

19. A satellite communication system as claimed in claim 18, wherein said manager terminal is programmable to assign said free slots to said terminals in accordance with a method selected from the group consisting of assigning said free slots equally among said terminals, assigning said free slots in proportion to said number of said slots currently assigned to each of said terminals, and assigning said free slots in inverse proportion to said number of said slots currently assigned to each of said terminals.

20. A satellite communication system as claimed in claim 17, wherein said manager terminal is programmable to assign said slots in said second slot class to guarantee a minimum amount of data is transmitted in said frame for corresponding ones of said terminals.

21. A satellite communication system as claimed in claim 20, wherein said manager terminal is programmable to dynamically classify each slot as one of said first and second slot classes, and a third class, and to assign said slots in said third class to said terminals when said terminals need to send data in excess of said guaranteed amount of data.

22. A satellite communication system as claimed in claim 20, wherein said digital memory device comprises a plurality of data queues for storing data received from corresponding ones of said plurality of ports, and said manager terminal is programmable to assign a number of said slots in said second slot class to empty said data queues without exceeding said guaranteed amount of data.

23. A satellite communication system as claimed in claim 22, wherein each of said terminals is programmable to release a selected number of said slots in said second slot class and assigned to said terminal for assignment to other ones of said terminals by said manager terminal when said released slots are not needed to empty said data queues, said released slots being reassigned to said terminal by said manager terminal when needed.

24. A satellite communication system as claimed in claim 23, wherein said manager terminal is programmable to assign said released slots assigned to a first one of said terminals to a second one of said terminals when said second one of said terminals needs to send data in excess of said guaranteed amount of data.

25. For use in a satellite communications system for providing full mesh connectivity among a number of earth terminals via a satellite link, the earth terminals being connected to user access devices to receive and transmit at least one of voice, video and other data, a method of dynamically assigning bandwidth on the satellite link to a terminal, the method comprising the steps of:

dividing slots which constitute a time division multiple access frame into a first group of slots and a second group of slots;

assigning each of said terminals a predetermined number of said slots in said first group of slots to provide a predetermined minimum bandwidth, and reserving a predetermined number of said slots in said second group of slots for dynamic allocation among said terminals in accordance with a burst plan, each of said terminals being operable to generate and transmit bursts in said slots assigned thereto from said slot first group of slots and allocated thereto from said second group of slots such that said slots need not be consecutive within said frame;

assigning each of said terminals a variable number of slots from said second group of slots in said time division multiple access frame in accordance with said burst plan wherein said assigned slots assigned to respective said terminals from said first group of slots and said second group of slots need not be consecutive within said frame, each of said terminals being operable to generate and transmit bursts during said assigned slots;

storing said burst plan in a digital memory device in each of said terminals;

monitoring data received from said user input devices connected to said terminals to determine when more bandwidth is needed at each of said terminals, each of said terminals being operable to generate bursts to transmit said data via the satellite using said assigned slots;

requesting additional ones of said second group of slots reserved for dynamic allocation for at least one terminal to increase the burst transmission rate thereof when more bandwidth is needed;

modifying said burst plan to reassign selected ones of said second group of slots reserved for dynamic allocation to said terminal; and storing said modified burst plan in said digital memory device in each of said terminals.

26. A method of dynamically assigning bandwidth as claimed in claim 25, wherein each of said slots in said time division multiple access frame is of fixed duration.

27. A method of dynamically assigning bandwidth as claimed in claim 25, wherein each of said terminals comprises data queues for storing said data from said user access devices, said monitoring step comprising the step of determining the length of said queues.

28. A method of dynamically assigning bandwidth as claimed in claim 25, wherein each of said terminals is assigned a committed information rate corresponding to at least one of said terminal, one of a plurality of ports thereon for connecting to said user access devices, and a virtual circuit connection associated with one of said plurality of ports, said requesting step comprising the step of generating a bandwidth message for requesting bandwidth comprising data relating said committed information rate, the amount of data received at each of said plurality of ports, and the type of data, said data type selected from the group consisting of voice, video and data.

29. A method of dynamically assigning bandwidth as claimed in claim 25, wherein one of said terminals is a manager terminal, and said requesting step further comprises the steps of generating bandwidth messages at each of said terminals, and transmitting said messages to said manager terminal via the satellite, said manager terminal being operable to reassign said slots in said second group of slots in response to said messages.

30. A method of dynamically assigning bandwidth as claimed in claim 25, wherein said modifying step further comprises the step of determining that a portion of the bandwidth for at least one of said terminals is not required.

31. A method of dynamically assigning bandwidth as claimed in claim 30, further comprising the steps of:

generating a message to said manager station from said terminal indicating that a number of said assigned slots are not being used by said terminal;

adjusting said burst plan by reassigning said unused slots to other ones of said terminals; and transmitting a modified burst plan to said terminals via the satellite link.

32. A method of dynamically assigning bandwidth as claimed in claim 25, wherein data received from respective ones of said user access devices is formatted into frames, and further comprising the steps of:

dividing said frames into fragments; and placing said fragments in different ones of said bursts.

33. A satellite communication system as claimed in claim 32, wherein said placing step further comprises the steps of:

prioritizing said frames from different ones of said user access devices for placement in said bursts; and generating said bursts by filling said burst with said fragments from said frame having the highest priority first; and filling in the remainder of said burst with said fragments from said frames having less priority.

34. A satellite communication system as claimed in claim 33, wherein said step of assigning each of said terminals a variable number of slots comprises the step of classifying each of said second group of slots as one of first and second slot classes, said first and second slot classes allowing for at least first and second levels, respectively, of prioritization for assigning said slots to said terminals.

* * * * *